United States Patent
Steinbach et al.

(10) Patent No.: US 11,973,232 B2
(45) Date of Patent: Apr. 30, 2024

(54) CATALYST

(71) Applicant: 3M Innovative Properties Company, Saint Paul, MN (US)

(72) Inventors: Andrew J. L. Steinbach, Shoreview, MN (US); Andrew T. Haug, Woodbury, MN (US); Amy Hester, Hudson, WI (US); Krzysztof A. Lewinski, Mahtomedi, MN (US); Sean M. Luopa, Minneapolis, MN (US); Grant M. Thoma, Woodbury, MN (US); Jonah D. Erlebacher, Chevy Chase, MD (US)

(73) Assignee: 3M Innovative Properties Company, St. Paul, MN (US)

( * ) Notice: Subject to any disclaimer, the term of this patent is extended or adjusted under 35 U.S.C. 154(b) by 837 days.

(21) Appl. No.: 17/045,101

(22) PCT Filed: Mar. 27, 2019

(86) PCT No.: PCT/US2019/024258
§ 371 (c)(1),
(2) Date: Oct. 2, 2020

(87) PCT Pub. No.: WO2019/195046
PCT Pub. Date: Oct. 10, 2019

(65) Prior Publication Data
US 2021/0151776 A1    May 20, 2021

Related U.S. Application Data

(60) Provisional application No. 62/652,598, filed on Apr. 4, 2018.

(51) Int. Cl.
*H01M 4/90*    (2006.01)
*C22C 5/04*    (2006.01)
*H01M 4/92*    (2006.01)

(52) U.S. Cl.
CPC ............. *H01M 4/9058* (2013.01); *C22C 5/04* (2013.01); *H01M 4/926* (2013.01)

(58) Field of Classification Search
CPC .. H01M 4/921; H01M 4/8621; H01M 4/9058; H01M 4/8605
See application file for complete search history.

(56) References Cited

U.S. PATENT DOCUMENTS 4,340,276 A    7/1982   Maffitt
4,447,506 A    5/1984   Luczak
(Continued)

FOREIGN PATENT DOCUMENTS

CN    102820475    2/2016
EP    2959968    12/2015
(Continued)

OTHER PUBLICATIONS

Artem, "Development of Ternary and Quaternary Catalysts for The Electrooxidation of Glycerol", The Scientific World Journal, 2012, vol. 2012, Article ID 502083, 6 pages.
(Continued)

*Primary Examiner* — Stephan J Essex

(57) ABSTRACT

Nanoporous oxygen reduction catalyst material comprising at least 90 collectively Pt, Ni, and Ta. The nanoporous oxygen reduction catalyst material is useful, for example, in fuel cell membrane electrode assemblies.

13 Claims, 5 Drawing Sheets

(56) References Cited

U.S. PATENT DOCUMENTS

| | | | |
|---|---|---|---|
| 4,568,598 | A | 2/1986 | Bilkadi |
| 4,812,352 | A | 3/1989 | Debe |
| 5,039,561 | A | 8/1991 | Debe |
| 5,068,161 | A | 11/1991 | Keck |
| 5,183,713 | A | 2/1993 | Kunz |
| 5,338,430 | A | 8/1994 | Parsonage |
| 5,759,944 | A | 6/1998 | Buchanan |
| 5,879,827 | A | 3/1999 | Debe |
| 5,879,828 | A | 3/1999 | Debe |
| 6,040,077 | A | 3/2000 | Debe |
| 6,136,412 | A | 10/2000 | Spiewak |
| 6,319,293 | B1 | 11/2001 | Debe |
| 6,805,972 | B2 | 10/2004 | Erlebacher |
| 7,419,741 | B2 | 9/2008 | Vernstrom |
| 7,901,829 | B2 | 3/2011 | Debe |
| 8,211,825 | B2 | 7/2012 | Mei |
| 8,673,773 | B2 | 3/2014 | Oppermann |
| 8,748,330 | B2 | 6/2014 | Debe |
| 8,895,206 | B2 | 11/2014 | Erlebacher |
| 2002/0004453 | A1 | 1/2002 | Haugen |
| 2004/0048466 | A1 | 3/2004 | Gore |
| 2005/0053826 | A1 | 3/2005 | Wang |
| 2010/0047668 | A1 | 2/2010 | Steinbach |
| 2012/0251915 | A1 | 10/2012 | Mei et al. |
| 2013/0209912 | A1* | 8/2013 | Theobald ............. H01M 4/921 429/482 |
| 2014/0246304 | A1 | 9/2014 | Debe |
| 2015/0093685 | A1 | 4/2015 | Yang |
| 2015/0311536 | A1 | 10/2015 | Atanasoska |
| 2015/0380758 | A1 | 12/2015 | Ball |
| 2016/0079604 | A1 | 3/2016 | Atanasoski |
| 2017/0200956 | A1 | 7/2017 | Nagami et al. |
| 2018/0062181 | A1 | 3/2018 | Gath |

FOREIGN PATENT DOCUMENTS

| | | |
|---|---|---|
| EP | 2954579 | 4/2018 |
| EP | 2843066 | 8/2019 |
| JP | H03-236160 | 10/1991 |
| JP | H06-132034 | 5/1994 |
| JP | 2010-280974 | 12/2010 |
| JP | 2011-014475 | 1/2011 |
| WO | WO 2001-048839 | 7/2001 |
| WO | WO 2008-025750 | 3/2008 |
| WO | WO 2009-135189 | 11/2009 |
| WO | WO 2010-092369 | 8/2010 |
| WO | WO 2010-138138 | 12/2010 |
| WO | WO 2012-017226 | 2/2012 |
| WO | WO 2012-107738 | 8/2012 |
| WO | WO 2013-055533 | 4/2013 |
| WO | WO 2014-099790 | 6/2014 |
| WO | WO 2014-122426 | 8/2014 |
| WO | WO 2014-122427 | 8/2014 |
| WO | WO 2016-100034 | 6/2016 |
| WO | WO 2016-191057 | 12/2016 |
| WO | WO 2018-080791 | 5/2018 |
| WO | WO 2019-193458 | 10/2019 |
| WO | WO 2019-193460 | 10/2019 |
| WO | WO 2019-193461 | 10/2019 |
| WO | WO 2019-195046 | 10/2019 |
| WO | WO 2019-198029 | 10/2019 |
| WO | WO 2019-198031 | 10/2019 |
| WO | WO 2019-198033 | 10/2019 |

OTHER PUBLICATIONS

Arun, "Electrochemical Characterization of Pt—Ru—Ni/C Anode Electrocatalyst for Methanol Electrooxidation in Membraneless Fuel Cells", RSC Advances, Jun. 2015, vol. 5, pp. 49643-49650.

Cheng, "Enhanced Activity and Stability of Core-Shell Structured PtRuNix Electrocatalysts for Direct Methanol Fuel Cells," International Journal of Hydrogen Energy, Jan. 2016, vol. 41, No. 3, pp. 1935-1943.

Chessin, "Paramagnetic Susceptibility, Electrical Resistivity, and Lattice Parameters of Nickel-Rich Nickel-Tantalum Alloys," Journal of Applied Physics, Aug. 1964, vol. 35 No. 8, pp. 2419-2423.

Choi, "Methanol Oxidation on Pt/Ru, Pt/Ni, and Pt/Ru/Ni Anode Electrocatalysts at Different Temperatures for DMFCs," Journal of the Electrochemical Society, 2003, vol. 150, No. 7, pp. A973-A978.

Chow, "Fabrication of Biologically Based Microstructure Composites for Vacuum Field Emission", Materials Science and Engineering, A158, Oct. 1992, vol. 158, No. 1, pp. 1-6.

Clancey, "Atomic Layer Deposition of Ultrathin Platinum Films on Tungsten Atomic Layer Deposition Adhesion Layers: Application to High Surface Area Substrates", Journal of Vacuum Science and Technology, Part A, Jan./Feb. 2015, vol. 33, No. 1, 9 pages.

Cooper, et al., "Combinatorial screening of fuel cell cathode catalyst compositions", Applied Surface Science, Nov. 2007, vol. 254, No. 3, pp. 662-668.

Debe, "Effect of Gravity on Copper Phthalocyanine Thin Films III: Microstructure Comparisons of Copper Phthalocyanine Thin Films Grown in Microgravity and Unit Gravity", Thin Solid Films, 186, 1990, pp. 327-347.

Debe, "Vacuum Vapor Deposited Thin Films of a Perylene Dicarboxide Derivative: Microstructure Versus Deposition Parameters", Journal of Vacuum Science & Technology A, vol. 6, No. 3, May/Jun. 1988, pp. 1907-1911.

Edwards, "Basic Materials Physics of Transparent Conducting Oxides", Dalton Transactions, 2004, vol. 19, pp. 2995-3002.

Erlebacher, "Evolution of Nanoporosity in Dealloying", Letters to Nature, Nature, Mar. 2001, vol. 410, pp. 450-453.

Gerstenberg "Effects of Nitrogen, Methane, and Oxygen on Structure and Electrical Properties of Thin Tantalum Films", Journal of Applied Physics, Feb. 1964, vol. 35, No. 2, pp. 402-407.

Hitosugi, Ta-doped Anatase $TiO_2$ Epitaxial Film as Transparent Conducting Oxide, Japanese Journal of Applied Physics, 2005, vol. 44, No. 34, pp. L1063-L1065.

Hu, "A Facile and Surfactant-Free Route for Nanomanufacturing of Tailored Ternary Nanoalloys as Superior Oxygen Reduction Reaction Electrocatalysts", Catalysis Science & Technology, Apr. 2017, vol. 7. No. 10, pp. 2074-2086.

Ioroi, "Platinum-Iridium Alloys as Oxygen Reduction Electrocatalysts for Polymer Electrolyte Fuel Cells", Journal of The Electrochemical Society, 2005, vol. 152, No. 10, pp. A1917-A1924.

Johnson, "In Situ Reactivity and TOF-SIMS Analysis of Surfaces Prepared by Soft and Reactive Landing of Mass-Selected Ions", Analytical Chemistry, 2010, vol. 82, No. 13, pp. 5718-5727.

Johnson, "Preparation of Surface Organometallic Catalysts by Gas-Phase Ligand Stripping and Reactive Landing of Mass-Selected Ions", Chemistry: A European Journal, 2010, vol. 16, No. 48, pp. 14433-14438.

Ju, "Electrical Properties of Amorphous Titanium Oxide Thin Films for Bolometric Application", Advances in Condensed Matter Physics, Nov. 2013, Article ID 365475, 5 pages.

Kam, "Summary Abstract: Dramatic Variation of the Physical Microstructure of a Vapor Deposited Organic Thin Film", Journal of Vacuum Science & Technology A, vol. 5, No. 4, Jul./Aug. 1987, pp. 1914-1916.

Kim, "High-Performance Quaternary PtRuIrNi Electrocatalysts with Hierarchical Nanostructured Carbon Support", Journal of Catalysis, Oct. 2013, vol. 306, pp. 133-145.

Lee, "Measurement and Modeling of the Reflectance-Reducing Properties of Gradient Index Microstructured Surfaces", Photographic Science and Engineering, vol. 24, No. 4, Jul./Aug. 1980, pp. 211-216.

Lewinski, "NSTF Advances for PEM Electrolysis—the Effect of Alloying on Activity of NSTF Electrolyzer Catalysts and Performance of NSTF Based PEM Electrolyzers", ECS Transactions, Oct. 2015, vol. 69, No. 17, pp. 893-917.

Li, "Preparation and Electrochemical Research of Anode Catalyst PtRuNi/C for Direct Methanol Fuel Cell", Journal of Biobased Materials and Bioenergy, Aug. 2013, vol. 7, No. 4, pp. 525-528.

Liang, "Synthesis and Structure—Activity Relationship Exploration of Carbon-Supported PtRuNi Nanocomposite as a CO-Tolerant

(56) References Cited

OTHER PUBLICATIONS

Electrocatalyst for Proton Exchange Membrane Fuel Cells", Journal of Physical Chemistry B, Mar. 2006, vol. 110, No. 15, pp. 7828-7834.
Liu, "Methanol Oxidation on Carbon-Supported Pt—Ru—Ni Ternary Nanoparticle Electrocatalysts", Journal of Power Sources, Jan. 2008, vol. 175, No. 1, pp. 159-165.
Liu, "Segmented Pt/Ru, Pt/Ni, and Pt/RuNi Nanorods as Model Bifunctional Catalysts for Methanol Oxidation", Small, Jan. 2006, vol. 2, No. 1, pp. 121-128.
Liu, "RDE Measurements of ORR Activity of $Pt_{1-x}Ir_x$ (0 <x< 0.3) on High Surface Area NSTF-Coated Glassy Carbon Disks", Journal of the Electrochemical Society, 2010, vol. 157, No. 2, pp. B207-B214.
Mani, "Dealloyed Binary $PtM_3$ (M=Cu, Co, Ni) and Ternary $PtNi_3M$ (M=Cu, Co, Fe, Cr) Electrocatalysts for the Oxygen Reduction Reaction: Performance in Polymer Electrolyte Membrane Fuel Cells", Journal of Power Sources, Jan. 2011, vol. 196, No. 2, pp. 666-673.
Martinez-Huerta, "Effect of Ni Addition Over PtRu/C Based Electrocatalysts for Fuel Cell Applications", Applied Catalysis B: Environmental, Dec. 2006, vol. 69, No. 1-2, pp. 75-84.
Moreno, "Synthesis of the Ceramic-Metal Catalysts (PtRuNi—$TiO_2$) by the Combustion Method", Journal of Power Sources, Jun. 2007, vol. 169, No. 1, pp. 98-102.
Nan, "A Core-Shell $Pd_1Ru_1Ni_2$@Pt/C Catalyst with a Ternary Alloy Core and Pt Monolayer: Enhanced Activity and Stability Towards the Oxygen Reduction Reaction by the Addition of Ni", Journal of Materials Chemistry A, 2016, vol. 4, No. 3, pp. 847-855.
Ohnuma, "Amorphous Ultrafine Metallic Particles Prepared by Sputtering Method", Rapidly Quenched Metals, (Proc. of the Fifth Int. Conf. on Rapidly Quenched Metals, Wurzburg, Germany, Sep. 3-7, 1984), S. Steeb et al., eds., Elsevier Science Publishers B. V., New York, (1985), pp. 1117-1124.
Palma, "Development of Plurimetallic Electrocatalysts Prepared by Decomposition of Polymeric Precursors for $EtOH/O_2$ Fuel Cell", Journal of the Brazilian Chemical Society, Mar. 2012, vol. 23, No. 3, pp. 555-564.
Palma, "Ethanol Electrooxidation by Plurimetallic Pt-Based Electrocatalysts Prepared by Microwave Assisted Heating", Journal of the Electrochemical Society, Feb. 2014, vol. 161, No. 4, pp. F473-F479.
Papaderakis, "Ternary Pt—Ru—Ni Catalytic Layers for Methanol Electrooxidation Prepared by Electrodeposition and Galvanic Replacement", Frontiers in Chemistry, Jun. 2014, vol. 2, Art. 29, pp. 1-11.
Park, "Chemical and Electronic Effects of Ni in Pt/Ni and Pt/Ru/Ni Alloy Nanoparticles in Methanol Electrooxidation", Journal of Physical Chemistry B, Feb. 2002, vol. 106, No. 8, pp. 1869-1877.
Paul, "Electrochemical Oxidation of Ethanol on Thin Coating of Platinum Based Material on Nickel Support", Indian Journal of Chemistry, May 2006, vol. 45, pp. 1144-1152.
Pierson, "Handbook of Refractory Carbides and Nitrides", Noyes Publications, Westwood New Jersey, 1996, Title Page, publication information, Preface, and pp. 1-7.
Ribadeneira, "Co-Catalytic Effect of Nickel in Pt—Ru/C and Pt—Sn/C Electrocatalysts for Ethanol Electrooxidation", Latin American Applied Research, Apr. 2010, vol. 40, No. 2, pp. 113-118.
Sadaoka, "Effects of Morphology on $NO_2$ Detection in Air at Room Temperature with Phthalocyanine Thin Films", Journal of Materials Science, vol. 25, 1990, pp. 5257-5268.
Scott, "The Journal of the Institute of Metals", 1919, vol. XXI, Title page, Table of Contents, and p. 441.
Shao, "Evaluation of the Performance of Carbon Supported Pt—Ru—Ni P as Anode Catalyst for Methanol Electrooxidation", Fuel Cells, 2010, vol. 10, No. 3, pp. 472-477.
Shen, "Comparison Study of Few-Layered Graphene Supported Platinum and Platinum Alloys for Methanol and Ethanol Electro-Oxidation", Journal of Power Sources, Mar. 2015, vol. 278, pp. 235-244.

Sheng Sui, "TiC Supported Pt—Ir Electrocatalyst Prepared by a Plasma Process for The Oxygen Electrode in Unitized Regenerative Fuel Cells", Journal of Power Sources, 2011, vol. 196, No. 13, pp. 5416-5422.
Shui, "Evolution of Nanoporous Pt—Fe Alloy Nanowires by Dealloying and their Catalytic Property for Oxygen Reduction Reaction", Advanced Functional Materials, Sep. 2011, vol. 21, No. 17, pp. 3357-3362.
Sudachom, "One Step $NaBH_4$ Reduction of Pt—Ru—Ni Catalysts on Different Types of Carbon Supports for Direct Ethanol Fuel Cells: Synthesis and Characterization," Journal of Fuel Chemistry and Technology, May 2017, vol. 45, No. 5, pp. 596-607.
Sun, "Ternary PtRuNi Nanocatalysts Supported on N-Doped Carbon Nanotubes: Deposition Process, Material Characterization, and Electrochemistry", Journal of the Electrochemical Society, Aug. 2009, vol. 156, No. 10, pp. B1249-B1252.
Tang, "High dispersion and electrocatalytic properties of platinum on well-aligned carbon nanotube arrays", Carbon, 2004, vol. 42, pp. 191-197.
Vliet, "Mesostructured thin films as electrocatalysts with tunable composition and surface morphology", Nature Materials, Dec. 2012, vol. 11, No. 12, pp. 1051-1058.
Wang, "Structurally ordered intermetallic platinum-cobalt core-shell nanoparticles with enhanced activity and stability as oxygen reduction electrocatalysts", Nature Materials, Jan. 2013, vol. 12, No. 1, pp. 81-87.
Wang, "An Advantageous Method for Methanol Oxidation: Design and Fabrication of a Nanoporous PtRuNi Trimetallic Electrocatalyst", Journal of Power Sources, Nov. 2011, vol. 196, No. 22, pp. 9346-9351.
Wang, "Effect of a Carbon Support Containing Large Mesopores on the Performance of a Pt—Ru—Ni/C Catalyst for Direct Methanol Fuel Cells", Journal of Physical Chemistry C, 2010, vol. 114, No. 1, pp. 672-677.
Wang, "Effect of Annealing Heat Treatment on Stability of Pt—Ru—Ni/C Catalyst for Direct Methanol Fuel Cell", Chinese Journal of Power Sources, Feb. 2009, Abstract only.
Wang, "Effect of Ni on PtRu/C Catalyst Performance for Ethanol Electrooxidation in Acidic Medium", Journal of Physical Chemistry C, 2008, vol. 112, No. 16, pp. 6582-6587.
Wang, "Electrochemical Impedance Studies on Carbon Supported PtRuNi and PtRu Anode Catalysts in Acid Medium for Direct Methanol Fuel Cell", Journal of Power Sources, Feb. 2007, vol. 165, No. 1, pp. 9-15.
Woo, "Electrocatalytic Characteristics of Pt—Ru—Co and Pt—Ru—Ni Based on Covalently Cross-Linked Sulfonated Poly (ether ether ketone)/Heteropolyacids Composite Membranes for Water Electrolysis", Journal of Industrial and Engineering Chemistry, Sep. 2010, vol. 16, No. 5, pp. 688-697.
Yang, "Truncated Octahedral Platinum-Nickel-Iridium Ternary Electrocatalyst for Oxygen Reduction Reaction", Journal of Power Sources, 2015, vol. 291, pp. 201-208.
Ye, "Carbon Nanotubes Supported Pt—Ru—Ni as Methanol Electro-Oxidation Catalyst for Direct Methanol Fuel Cells", Journal of Natural Gas Chemistry, Jun. 2007, vol. 16, No. 2, pp. 162-166.
Yousaf, "Method to Prepare Ternary Methanol Electro-Oxidation Catalysts for Direct Methanol Fuel Cell Applications", Journal of The Electrochemical Society, Apr. 2017, vol. 164, No. 6, pp. 667-673.
Zhang, "Preparation of Pt—Ru—Ni Ternary Nanoparticles by Microemulsion and Electrocatalytic Activity for Methanol Oxidation," Materials Research Bulletin, Feb. 2007, vol. 42, No. 2, pp. 327-333.
Zhao, "Electrodeposition of Pt—Ru and Pt—Ru—Ni Nanoclusters on Multi-Walled Carbon Nanotubes for Direct Methanol Fuel Cell", International Journal of Hydrogen Energy, Mar. 2014, vol. 39, No. 9, pp. 4544-4557.
International Search Report for PCT International Application No. PCT/IB2019/052496, dated Jun. 6, 2019, 5 pages.
International Search Report for PCT International Application No. PCT/IB2019/052498, dated Jun. 17, 2019, 5 pages.
International Search Report for PCT International Application No. PCT/IB2019/052499, dated Jun. 6, 2019, 5 pages.

(56) References Cited

OTHER PUBLICATIONS

International Search Report for PCT International Application No. PCT/US2019/024258, dated Sep. 25, 2019, 5 pages.
International Search Report for PCT International Application No. PCT/IB2019/053001, dated Jul. 4, 2019, 6 pages.
International Search Report for PCT International Application No. PCT/IB2019/053003, dated Sep. 2, 2019, 7 pages.
International Search Report for PCT International Application No. PCT/IB2019/053006, dated Jul. 12, 2019, 4 pages.
International Preliminary Report on Patentability for PCT International Application No. PCT/US2019/024258, dated Oct. 6, 2020, 8 pages.
International Preliminary Report on Patentability for PCT International Application No. PCT/IB2019/053001, dated Oct. 13, 2020, 7 pages.

* cited by examiner

CATALYST

CROSS REFERENCE TO RELATED APPLICATION

This application is the § 371 U.S. National Stage of International Application No. PCT/US2019/024258, filed 27 Mar. 2019, which claims the benefit of U.S. Provisional Patent Application No. 62/652,598, filed Apr. 4, 2018, the disclosures of which are incorporated by reference herein in their entireties.

This invention was made with Government support under Contract No. DE-EE0007270 awarded by DOE. The Government has certain rights in this invention.

BACKGROUND

Fuel cells produce electricity via electrochemical oxidation of a fuel and reduction of an oxidant. Fuel cells are generally classified by the type of electrolyte and the type of fuel and oxidant reactants. One type of fuel cell is a polymer electrolyte membrane fuel cell (PEMFC), where the electrolyte is a polymeric ion conductor and the reactants are hydrogen fuel and oxygen as the oxidant. The oxygen is often provided from the ambient air.

PEMFCs typically require the use of electrocatalysts to improve the reaction rate of the hydrogen oxidation reaction (HOR) and oxygen reduction reactions (ORR), which improve the PEMFC performance. PEMFC electrocatalysts often comprise platinum, a relatively expensive precious metal. It is typically desirable to minimize the platinum content in PEMFC devices to minimize cost. Sufficient platinum content, however, is needed to provide sufficient catalytic activity and PEMFC device performance. As such, there is a desire to increase the catalyst activity per unit catalyst mass (mass activity). There are two general approaches to increase the mass activity, namely increasing the catalyst activity per unit catalyst surface area (specific activity) and increasing the catalyst surface area per catalyst mass (specific surface area or specific area). The HOR and ORR occur on the catalyst surface, so increasing the specific surface area and/or the specific activity can reduce the amount of catalyst needed to achieve a desired absolute performance, reducing cost.

To maximize specific area, PEMFC electrocatalysts are often in the form of nanometer-scale thin films or particles on support materials. An exemplary support material for nanoparticle PEMFC electrocatalysts is carbon black, and an exemplary support material for thin film electrocatalysts is whiskers.

To increase the specific activity, PEMFC Pt ORR electrocatalysts often also comprise certain transition metals such as cobalt or nickel. Without being bound by theory, incorporation of certain transition metals into the Pt lattice is believed to induce contraction of the Pt atoms at the catalyst surface, which increases the kinetic reaction rate by modification of the molecular oxygen binding and dissociation energies and the binding energies of reaction intermediates and/or spectator species.

PEMFC electrocatalysts may incorporate other precious metals. For example, HOR PEMFC Pt electrocatalysts can be alloyed with ruthenium to improve tolerance to carbon monoxide, a known Pt catalyst poison. HOR and ORR PEMFC electrocatalysts may also incorporate iridium to facilitate improved activity for the oxygen evolution reaction (OER). Improved OER activity may improve the durability of the PEMFC under inadvertent operation in the absence of fuel and during PEMFC system startup and shutdown. Incorporation of iridium into the PEMFC ORR electrocatalyst, however, may result in decreased mass activity and higher catalyst cost. Iridium has relatively lower specific activity for ORR than platinum, potentially resulting in decreased mass activity. Iridium is also a precious metal, and thereby its incorporation can increase cost. PEMFC Pt electrocatalysts may also incorporate gold, which is also a precious metal and can increase cost. Gold is known to be relatively inactive for HOR and ORR in acidic electrolytes. Incorporation of gold can result in substantial deactivation for HOR and ORR due to the propensity for gold to preferentially segregate to the electrocatalyst surface, blocking active catalytic sites.

PEMFC electrocatalysts may have different structural and compositional morphologies. The structural and compositional morphologies are often tailored through specific processing methods during the electrocatalyst fabrication, such as variations in the electrocatalyst deposition method and annealing methods. PEMFC electrocatalysts can be compositionally homogenous, compositionally layered, or may contain composition gradients throughout the electrocatalyst. Tailoring of composition profiles within the electrocatalyst may improve the activity and durability of electrocatalysts. PEMFC electrocatalyst particles or nanometer-scale films may have substantially smooth surfaces or have atomic or nanometer scale roughness. PEMFC electrocatalysts may be structurally homogenous or may be nanoporous, being comprised of nanometer-scale pores and solid catalyst ligaments.

As compared to structurally homogenous electrocatalysts, nanoporous PEMFC electrocatalysts may have higher specific area, thereby reducing cost. Nanoporous catalysts are comprised of numerous interconnected nanoscale catalyst ligaments, and the surface area of a nanoporous material depends upon the diameter and volumetric number density of the nanoscale ligaments. Surface area is expected to increase as the nanoscale ligaments diameter decreases and the volumetric number density increases.

One method of forming nanoporous PEMFC electrocatalysts is via dealloying of a transition metal rich Pt alloy precursor, such as a PtNi alloy with 30 at. % Pt and 70 at. % Ni. During dealloying, the precursor is exposed to conditions where the transition metal is dissolved and the surface Pt has sufficient mobility to allow exposure of subsurface transition metal and formation of nanoscale ligaments which separate the nanopores. Dealloying to form nanopores can be induced via free corrosion approaches, such as exposure to acid, or via exposure to repeated electrochemical oxidation and reduction cycles. Electrocatalyst nanopore formation may occur spontaneously during electrochemical operation within a PEMFC, or may occur via ex-situ processing prior to PEMFC operation.

In PEMFC devices, electrocatalysts may lose performance over time due to a variety of degradation mechanisms, which induce structural and compositional changes. Such performance loss may shorten the practical lifetime of such systems. Electrocatalyst degradation may occur, for example, due to loss of electrocatalyst activity per unit surface area and loss of electrocatalyst surface area. Electrocatalyst specific activity may be lost, for example, due to the dissolution of electrocatalyst alloying elements. Non-porous nanoparticle and nano-scale thin films may lose surface area, for example, due to Pt dissolution, particle sintering, and loss of surface roughness. Nanoporous electrocatalysts may additionally lose surface area, for example, due to increased nanoscale ligament diameter and decreased nanoscale ligament density.

Additional electrocatalysts and systems containing such catalysts are desired, including those that address one or more of the issues discussed above.

SUMMARY

In one aspect, the present disclosure provides a nanoporous oxygen reduction catalyst material comprising at least 90 (in some embodiments, at least 95, 96, 97, 98, 99, 99.5, 99.6, 99.7, 99.8, 99.9, or event 100) atomic percent collectively Pt, Ni, and Ta. In some embodiments, the nanoporous oxygen reduction catalyst material comprises in a range from 52.7 to 61.9 atomic percent Pt, in a range from 34.4 to 43.3 atomic percent Ni, and in a range from 0.2 to 10.5 atomic percent Ta (in some embodiments in a range from 52.7 to 59.6 atomic percent Pt, in a range from 34.4 to 43.3 atomic percent Ni, and in a range from 0.3 to 10.5 atomic percent Ta; in a range from 52.7 to 59.6 atomic percent Pt, in a range from 38.8 to 43.3 atomic percent Ni, and in a range from 0.3 to 4.0 atomic percent Ta; in a range from 59.0 to 59.6 atomic percent Pt, in a range from 38.8 to 40.7 atomic percent Ni, and in a range from 0.3 to 1.8 atomic percent Ta; in a range from 52.7 to 59.6 atomic percent Pt, in a range from 34.4 to 43.3 atomic percent Ni, and in a range from 0.8 to 10.5 atomic percent Ta; in a range from 52.7 to 59.6 atomic percent Pt, in a range from 38.8 to 43.3 atomic percent Ni, and in a range from 0.8 to 4.0 atomic percent Ta; in a range from 59.4 to 59.6 atomic percent Pt, in a range from 38.8 to 39.5 atomic percent Ni, and in a range from 0.8 to 1.8 atomic percent Ta; in a range from 52.7 to 59.4 atomic percent Pt, in a range from 34.4 to 43.3 atomic percent Ni, and in a range from 1.8 to 10.5 atomic percent Ta; and in a range from 52.7 to 59.4 atomic percent Pt, in a range from 38.8 to 43.3 atomic percent Ni, and in a range from 1.8 to 4.0 atomic percent Ta), wherein the total atomic percent of Pt, Ni, and Ta equals 100.

In some embodiments, the catalyst material functions as an oxygen reduction catalyst material.

In some embodiments, the nanoporous oxygen reduction catalyst material has pores with diameters in a range from 1 nm to 10 nm (in some embodiments, in a range from 2 nm to 8 nm, or even 3 nm to 7 nm).

In some embodiments, nanoporous oxygen reduction catalyst material described herein has been annealed.

Surprisingly, Applicants discovered the addition of tantalum to nanoporous catalyst comprising Pt and Ni can substantially improve retention of mass activity and specific activity after accelerated electrocatalyst aging. Tantalum was observed to improve the durability when incorporated at the surface of the catalysts prior to annealing and dealloying to form nanoporous catalyst comprising at least 90 atomic percent Pt, Ni, and Ta, wherein the total atomic percent of Pt, Ni, and Ta equals 100.

Nanoporous oxygen reduction catalyst materials described herein are useful, for example, in fuel cell membrane electrode assemblies. For example, a catalyst used in a fuel cell membrane electrode assembly may comprise nanostructured elements comprising microstructured support whiskers having an outer surface at least partially covered by the nanoporous oxygen reduction catalyst material described herein.

DETAILED DESCRIPTION

Figure 1:
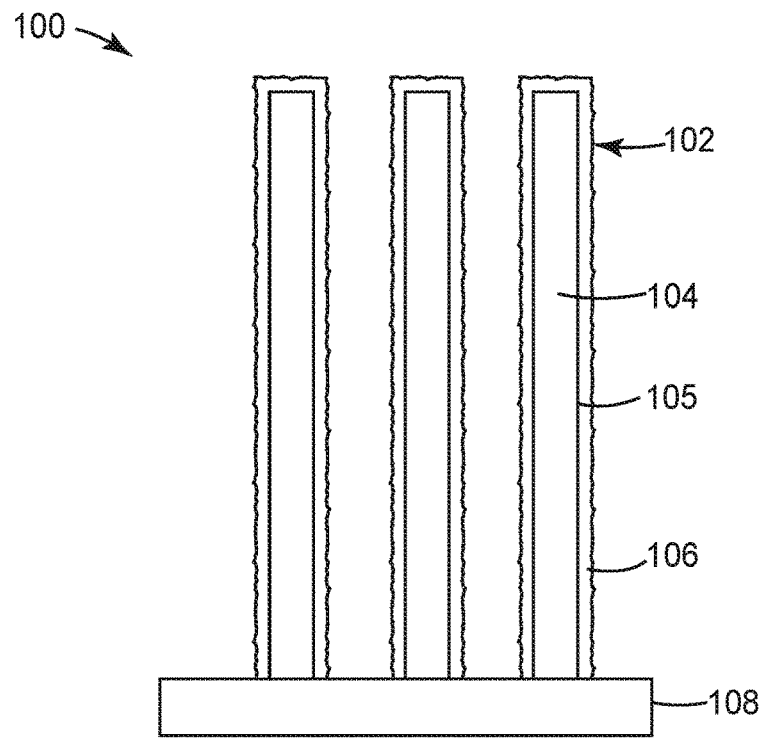
FIG. 1 is a side view of an exemplary catalyst described herein.

Referring to FIG. 1, exemplary catalyst 100 on substrate 108 has nanostructured elements 102 with microstructured whiskers 104 having outer surface 105 at least partially covered by nanoporous oxygen reduction catalyst material 106 comprising at least 90 atomic percent Pt, Ni, and Ta, wherein the total atomic percent of Pt, Ni, and Ta equals 100.

Figure 1A:
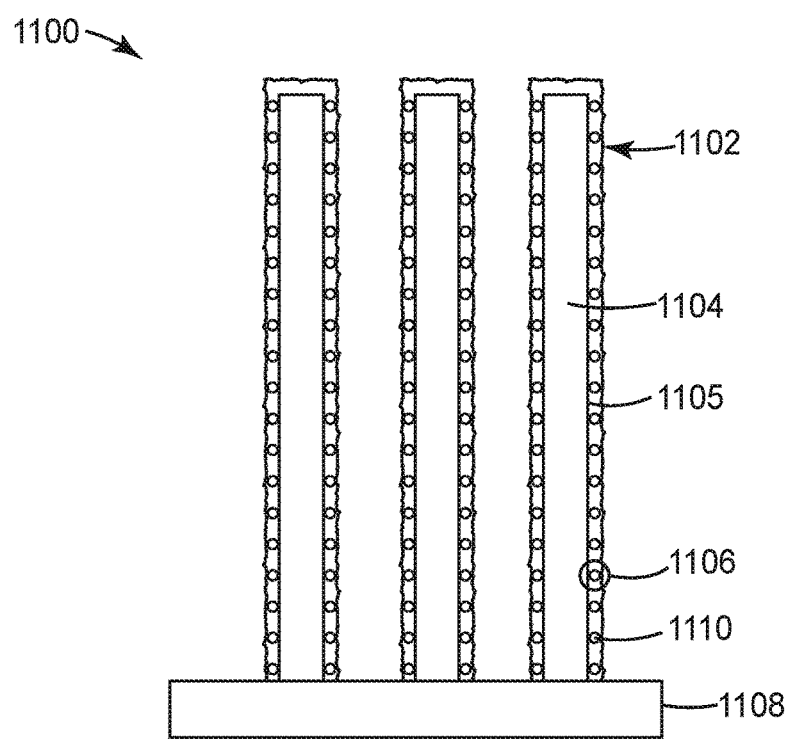
FIG. 1A is a side view of an exemplary catalyst described herein.

Referring to FIG. 1A, in some embodiments, the layer(s) dealloyed are part of a catalyst such as exemplary catalyst 1100 on substrate 1108 having nanostructured elements 1102 with microstructured whiskers 1104 having outer surface 1105 at least partially covered by catalyst material 1106 comprising at least 90 atomic percent Pt, Ni, and Ta, wherein the total atomic percent of Pt Ni, and Ta equals 100. Catalyst material 1106 has pores 1110.

In some embodiments, the nanoporous oxygen reduction catalyst material comprises PtNiTa. In some embodiments, the nanoporous oxygen reduction catalyst material has pores with diameters in a range from 1 nm to 10 nm (in some embodiments, in a range from 2 nm to 8 nm, or even 3 nm to 7 nm). In some embodiments, the nanoporous oxygen reduction catalyst material comprises at least 90 (in some embodiments, at least 95, 96, 97, 98, 99, 99.5, 99.6, 99.7, 99.8, 99.9, or event 100) atomic percent Pt, Ni, and Ta. In some embodiments, the nanoporous oxygen reduction catalyst material comprises in a range from 52.7 to 61.9 atomic percent Pt, in a range from 34.4 to 43.3 atomic percent Ni, and in a range from 0.2 to 10.5 atomic percent Ta (in some embodiments in a range from 52.7 to 59.6 atomic percent Pt, in a range from 34.4 to 43.3 atomic percent Ni, and in a range from 0.3 to 10.5 atomic percent Ta; in a range from 52.7 to 59.6 atomic percent Pt, in a range from 38.8 to 43.3 atomic percent Ni, and in a range from 0.3 to 4.0 atomic percent Ta; in a range from 59.0 to 59.6 atomic percent Pt, in a range from 38.8 to 40.7 atomic percent Ni, and in a range from 0.3 to 1.8 atomic percent Ta; in a range from 52.7 to 59.6 atomic percent Pt, in a range from 34.4 to 43.3 atomic percent Ni, and in a range from 0.8 to 10.5 atomic percent Ta; in a range from 52.7 to 59.6 atomic percent Pt, in a range from 38.8 to 43.3 atomic percent Ni, and in a range from 0.8 to 4.0 atomic percent Ta; in a range from 59.4 to 59.6 atomic percent Pt, in a range from 38.8 to 39.5 atomic percent Ni, and in a range from 0.8 to 1.8 atomic percent Ta; in a range from 52.7 to 59.4 atomic percent Pt, in a range from 34.4 to 43.3 atomic percent Ni, and in a range from 1.8 to 10.5 atomic percent Ta; and in a range from 52.7 to 59.4 atomic percent Pt, in a range from 38.8 to 43.3 atomic percent Ni, and in a range from 1.8 to 4.0 atomic percent Ta), wherein the total atomic percent of Pt, Ni, and Ta equals 100. In some embodiments, the nanoporous oxygen reduction catalyst material has a weight ratio of platinum to tantalum in a range from 2:1 to 250:1 (in some embodiments, in a range from 5:1 to 15:1, 3:1 to 30:1, 30:1 to 250:1, 15:1 to 250:1, 2:1 to 108:1, 5:1 to 108:1, 13:1 to 108:1, 27:1 to 54:1, 5:1 to 54:1 13:1 to 54:1, 27:1 to 54:1 5:1 to 27:1, or even from 13:1 to 27:1).

In some embodiments, the nanoporous oxygen reduction catalyst material is in the form of at least one nanoporous layer comprising platinum and nickel. In some embodiments, the nanoporous layers comprising platinum and nickel have a planar equivalent thicknesses (i.e., the thickness if deposited on a substantially flat, planar substrate) up to 600 nm (in some embodiments, up to 575 nm, 550 nm, 500 nm, 400 nm, 300 nm, 200 nm, 100 nm, 75 nm, 50 nm, 25 nm, 10 nm. 5 nm, 2.5 nm, 1 nm, or even up to two monolayers (e.g., 0.4 nm); in some embodiments, in a range from 0.4 nm to 600 nm, 0.4 nm to 500 nm, 1 nm to 500 nm, 5 nm to 500 nm, 10 nm to 500 nm, 10 nm to 400 nm, or even 40 nm to 300 nm). In some embodiments, there is a layer comprising tantalum on at least one of the nanoporous layers comprising platinum and nickel. In some embodiments, the layer comprising tantalum has a planar equivalent thickness up to 50 nm (in some embodiments, up to 45 nm, 40 nm, 35 nm, 30 nm, 25 nm, 20 nm, 15 nm, 10 nm, 5 nm, 4 nm, 3 nm, 2 nm, 1 nm, 0.5 nm, a monolayer (e.g., 0.2 nm) or even less than a monolayer (e.g., 0.01 nm); in some embodiments, in a range from 0.01 nm to 50 nm, 1 nm to 50 nm, 5 nm to 40 nm, 5 nm to 35 nm, 0.5 nm to 20 nm, 0.5 nm to 10 nm, 0.5 nm to 3.7 nm, 0.5 nm to 1.8 nm, 0.9 nm to 20 nm, 0.9 nm to 10 nm, 0.9 nm to 3.7 nm, 0.9 nm to 1.8 nm, 1.8 nm to 20 nm, 1.8 nm to 10 nm, or even 1.8 nm to 3.7 nm). In some embodiments, the nanoporous oxygen reduction catalyst material has an exposed tantalum surface layer (in some embodiments, the exposed tantalum surface layer is a sub-monolayer of tantalum). In some embodiments, the nanoporous oxygen reduction catalyst material has a weight ratio of platinum to tantalum is in a range from 2:1 to 250:1 (in some embodiments, in a range from 5:1 to 15:1; 3:1 to 30:1; 30:1 to 250:1, 15:1 to 250:1, 2:1 to 108:1, 5:1 to 108:1, 13:1 to 108:1, 27:1 to 54:1, 5:1 to 54:1, 13:1 to 54:1, 27:1 to 54:1, 5:1 to 27:1, or even from 13:1 to 27:1).

In some embodiments, a catalyst comprises nanostructured elements comprising microstructured support whiskers having an outer surface at least partially covered by the nanoporous oxygen reduction catalyst material.

Suitable whiskers can be provided by techniques known in the art, including those described in U.S. Pat. No. 4,812,352 (Debe), U.S. Pat. No. 5,039,561 (Debe), U.S. Pat. No. 5,338,430 (Parsonage et al.), U.S. Pat. No. 6,136,412 (Spiewak et al.), and U.S. Pat. No. 7,419,741 (Vemstrom et al.), the disclosures of which are incorporated herein by reference. In general, microstructured whiskers can be provided, for example, by vacuum depositing (e.g., by sublimation) a layer of organic or inorganic material onto a substrate (e.g., a microstructured catalyst transfer polymer sheet), and then, in the case of perylene red deposition, converting the perylene red pigment into microtructured whiskers by thermal annealing. Typically, the vacuum deposition steps are carried out at total pressures at or below about $10^{-3}$ Ton or 0.1 Pascal. Exemplary microstructures are made by thermal sublimation and vacuum annealing of the organic pigment C.I. Pigment Red 149 (i.e., N,N'-di(3,5-xylyl)perylene-3,4:9,10-bis(dicarboximide)). Methods for making organic microstructured layers are reported, for example, in Materials Science and Engineering, A158, (1992), pp. 1-6; J. Vac. Sci. Technol. A, 5, (4), July/August 1987, pp. 1914-16; J. Vac. Sci, Technol. A, 6, (3), May/August 1988, pp. 1907-11; Thin Solid Films, 186, 1990, pp. 327-47; J. Mat. Sci., 25, 1990, pp. 5257-68; Rapidly Quenched Metals, Proc. of the Fifth Int. Conf. on Rapidly Quenched Metals, Wurzburg, Germany (Sep. 3-7, 1984), S. Steeb et al., eds., Elsevier Science Publishers B.V., New York, (1985), pp. 1117-24; Photo. Sci. and Eng., 24, (4), July/August 1980, pp. 211-16; and U.S. Pat. No. 4,340,276 (Maffitt et al.) and U.S. Pat. No. 4,568,598 (Bilkadi et al.), the disclosures of which are incorporated herein by reference. Properties of catalyst layers using carbon nanotube arrays are reported in the article "High Dispersion and Electrocatalyfic Properties of Platinum on Well-Aligned Carbon Nanotube Arrays", Carbon, 42, (2004), pp. 191-197. Properties of catalyst layers using grassy or bristled silicon are reported, for example, in U.S. Pat. Pub. No. 2004/0048466 Al (Gore et al.).

Vacuum deposition may be carried out in any suitable apparatus (see, e.g., U.S. Pat. No. 5,338,430 (Parsonage et al.), U.S. Pat. No. 5,879,827 (Debe et al.), U.S. Pat. No. 5,879,828 (Debe et al.), U.S. Pat. No. 6,040,077 (Debe et al.), and U.S. Pat. No. 6,319,293 (Debe et al.), and U.S. Pat. Pub. No. 2002/0004453 A 1 (Haugen et al.), the disclosures of which are incorporated herein by reference). One exemplary apparatus is depicted schematically in FIG. 4A of U.S. Pat. No. 5,338,430 (Parsonage et al.), and discussed in the accompanying text, wherein the substrate is mounted on a drum, which is then rotated over a sublimation or evaporation source for depositing the organic precursor (e.g., perylene red pigment) prior to annealing the organic precursor in order to form the whiskers.

Typically, the nominal thickness of deposited perylene red pigment is in a range from about 50 nm to 500 nm. Typically, the whiskers have an average cross-sectional dimension in a range from 20 nm to 60 nm and an average length in a range from 0.3 micrometer to 3 micrometers.

In some embodiments, the whiskers are attached to a backing. Exemplary backings comprise polyimide, nylon, metal foils, or other materials that can withstand the thermal annealing temperature up to 300° C. In some embodiments, the backing has an average thickness in a range from 25 micrometers to 125 micrometers.

In some embodiments, the backing has a microstructure on at least one of its surfaces. In some embodiments, the microstructure is comprised of substantially uniformly shaped and sized features at least three (in some embodiments, at least four, five, ten, or more) times the average size of the whiskers. The shapes of the microstructures can, for example, be V-shaped grooves and peaks (see, e.g., U.S. Pat. No. 6,136,412 (Spiewak et al.), the disclosure of which is incorporated herein by reference) or pyramids (see, e.g., U.S. Pat. No. 7,901,829 (Debe et al.), the disclosure of which is incorporated herein by reference). In some embodiments, some fraction of the microstructure features extends above the average or majority of the microstructured peaks in a periodic fashion, such as every 31$^{st}$ V-groove peak being 25% or 50% or even 100% taller than those on either side of it. In some embodiments, this fraction of features that extends above the majority of the microstructured peaks can be up to 10% (in some embodiments up to 3%, 2%, or even up to 1%). Use of the occasional taller microstructure features may facilitate protecting the uniformly smaller microstructure peaks when the coated substrate moves over the surfaces of rollers in a roll-to-roll coating operation. The occasional taller feature touches the surface of the roller rather than the peaks of the smaller microstructures, so much less of the microstructured material or whisker material is likely to be scraped or otherwise disturbed as the substrate moves through the coating process. In some embodiments, the microstructure features are substantially smaller than half the thickness of the membrane that the catalyst will be transferred to in making a membrane electrode assembly. This is so that during the catalyst transfer process, the taller microstructure features do not penetrate through the membrane where they may overlap the electrode on the opposite side of the membrane. In some embodiments, the tallest microstructure features are less than $\frac{1}{3}^{rd}$ or $\frac{1}{4}^{th}$ of the membrane thickness. For the thinnest ion exchange membranes (e.g., about 10 micrometers to 15 micrometers in thickness), it may be desirable to have a substrate with microstructured features no larger than about 3 micrometers to 4.5 micrometers tall. The steepness of the sides of the V-shaped or other microstructured features or the included angles between adjacent features may, in some embodiments, be desirable to be on the order of 90° for ease in catalyst transfer during a lamination-transfer process and to have a gain in surface area of the electrode that comes from the square root of two (1.414) surface area of the microstructured layer relative to the planar geometric surface of the substrate backing.

In general, catalyst material can be deposited by techniques known in the art. Exemplary deposition techniques include those independently selected from the group consisting of sputtering (including reactive sputtering), atomic layer deposition, molecular organic chemical vapor deposition, molecular beam epitaxy, thermal physical vapor deposition, vacuum deposition by electrospray ionization, and pulse laser deposition. Additional general details can be found, for example, in U.S. Pat. No. 5,879,827 (Debe et al.), U.S. Pat. No. 6,040,077 (Debe et al.), and U.S. Pat. No. 7,419,741 (Vernstrom et al.), the disclosures of which are incorporated herein by reference. The thermal physical vapor deposition method uses suitable elevated temperature (e.g., via resistive heating, electron beam gun, or laser) to melt or sublimate the target (source material) into a vapor state, which is in turn passed through a vacuum space, then condensing of the vaporized form onto substrate surfaces. The thermal physical vapor deposition equipment is known in the art, including that available, for example, as a metal evaporator or as an organic molecular evaporator from CreaPhys GmbH, Dresden, Germany, under the trade designations "METAL EVAPORATOR (ME-SERIES)" or "ORGANIC MOLECULAR EVAPORATOR (DE-SEREIS)" respectively; another example of an organic materials evaporator is available from Mantis Deposition Ltd., Oxfordshire, UK, under the trade designation "ORGANIC MATERIALS EVAPORATIOR (ORMA-SERIES)." Catalyst material to be dealloyed comprising multiple alternating layers can be sputtered, for example, from multiple targets (e.g., Pt is sputtered from a first target, Ni is sputtered from a second target, and Ta from a third, or from a target(s) comprising more than one element (e.g., Pt and Ni)). If the catalyst coating is done with a single target, it may be desirable that the coating layer be applied in a single step onto the gas distribution layer, gas dispersion layer, catalyst transfer layer, or membrane, so that the heat of condensation of the catalyst coating heats the underlying catalyst or support Pt, Ni, or Ta atoms as applicable and substrate surface sufficient to provide enough surface mobility that the atoms are well mixed and form thermodynamically stable alloy domains. Alternatively, for example, the substrate can also be provided hot or heated to facilitate this atomic mobility. In some embodiments, sputtering is conducted at least in part in an atmosphere comprising at least a mixture of argon. Organometallic forms of catalysts can be deposited, for example, by soft or reactive landing of mass selected ions. Soft landing of mass-selected ions is used to transfer catalytically-active metal complexes complete with organic ligands from the gas phase onto an inert surface. This method can be used to prepare materials with defined active sites and thus achieve molecular design of surfaces in a highly-controlled way under either ambient or traditional vacuum conditions. For additional details see, for example, Johnson et al., Anal. Chem., 2010, 82, pp. 5718-5727, and Johnson et al., Chemistry: A European Journal, 2010, 16, pp. 14433-14438, the disclosures of which are incorporated herein by reference.

The thickness of an individual deposited catalyst layer may depend, for example, on the areal catalyst loading of the layer and the catalyst density. For example, the thickness of a single layer of Pt with 10 micrograms of Pt per $cm^2$ planar area and density of 21.45 $g/cm^3$ deposited onto a planar substrate is calculated as 4.7 nm, and the thickness of a Ni layer (8.90 $g/cm^3$) with the same areal loading is 11.2 nm. The thickness of a deposited layer can range from a sub-monolayer to several monolayers in thickness. A monolayer is a single, closely packed layer of atoms or molecules. The thickness of a monolayer is of the dimension of the atomic or molecular diameter. The diameter of a Pt atom is about 0.27 nm. The diameter of a Ni atom is about 0.27 nm. The diameter of a Ta atom is about 0.29 nm. A sub-monolayer is the same physical thickness of a monolayer, but contains fewer atoms or molecules than a closely packed layer. For example, a Pt sub-monolayer which had 50% of the number of Pt atoms per unit area as a full monolayer has a calculated thickness which is 50% of a full monolayer (i.e., about 0.135 nm). One or more layers can be deposited, resulting in a catalyst material with an overall planar equivalent thickness equal to the sum of each constituent layer's planar equivalent thickness.

In some embodiments, methods for making catalyst described herein comprises: providing an oxygen reduction catalyst material comprising Pt, Ni, and Ta, wherein there are layers comprising platinum and nickel; and dealloying at least some layers comprising platinum and nickel to remove at least a portion of the nickel from at least one layer to provide the nanoporous oxygen reduction catalyst material. In some embodiments, there are pores with diameters in a range from 1 nm to 10 nm (in some embodiments, in a range from 2 nm to 8 nm, or even 3 nm to 7 nm) where the nickel was removed. In some embodiments, methods for making catalyst described herein comprises annealing the catalyst before dealloying.

The nanoporosity within the catalyst layer is typically provided by dealloying the catalyst material to remove a portion of the nickel. In general, dealloying can be accomplished by techniques known in the art, including via "free-corrosion" approaches (e.g., immersion in acid) or via electrochemical processing (e.g., potential cycling in acidic media). Nanoporosity formation typically occurs in alloys comprising at least two components with sufficiently different dissolution rates in the dealloying medium and when the more noble component has sufficient surface mobility. For additional details see, for example, Erlebacher et al., Nature, 2001, 410, pp. 450-453; and U.S. Pat. No. 6,805,972 B2 (Erlebacher et al.); U.S. Pat. No. 8,673,773 B2 (Opperman et al.); and U.S. Pat. No. 8,895,206 B2 (Erlebacher et al.), the disclosures of which are incorporated herein by reference.

In some embodiments, catalyst material to be dealloyed or the (dealloyed) nanoporous oxygen reduction catalyst material is annealed. in some embodiments, the catalyst material is annealed before dealloying. In general, annealing can be done by techniques known in the art, including heating the catalyst via, for example, in an oven or furnace, with a laser, and with infrared techniques. Annealing can be conducted, for example, in inert or reactive gas environments. Although not wanting to be bound by theory, it is believed annealing can induce structural changes on the atomic scale which can influence activity and durability of catalysts. Further, it is believed annealing nanoscale particles and films can induce mobility in the atomic constituent(s), which can cause growth of particles or thin film grains. In the case of multi-element mixtures, alloys, or layered particles and films, it is believed annealing can induce, for example, segregation of components within the particle or film to the surface, formation of random, disordered alloys, and formation of ordered intermetallics, depending upon the component element properties and the annealing environment. For additional details regarding annealing see, for example, van der Vliet et al., Nature. Materials, 2012, 11, pp. 1051-1058; Wang et al., Nature. Materials, 2013, 12, pp. 81-87, and U.S. Pat. No. 8,748,330 B2 (Debe et al.), the disclosures of which are incorporated herein by reference.

In some embodiments, methods for making catalyst described herein comprises depositing platinum and nickel from a target comprising platinum and nickel and depositing tantalum from a target comprising tantalum. In some embodiments, methods for making the catalyst described herein comprises deposition from a $Pt_3Ni_7$ target. In some embodiments, methods for making catalyst described herein comprises depositing platinum from a target comprising platinum, depositing nickel from a target comprising nickel, and depositing tantalum from a target comprising tantalum. In some embodiments, the layers comprising platinum and nickel having a planar equivalent thickness in a range from 0.4 nm to 580 nm (in some embodiments, in a range from 0.4 nm to 72 nm) and depositing layers comprising tantalum have a planar equivalent thickness in a range from 0.01 nm to 32 nm (in some embodiments, in a range from 0.01 nm to 16 nm, or even a range from 0.01 run to 2 nm). In some embodiments, methods for making the catalyst described herein comprises providing a catalyst comprising platinum, nickel, and tantalum, wherein the weight ratio of platinum to tantalum is in a range from 6:1 to 329:1 (in some embodiments, in a range from 6:1 to 187:1, 14:1 to 187:1, 36:1 to 187:1, 6:1 to 78:1, 14:1 to 78:1, 36:1 to 78:1, 36:1 to 78:1, 6:1 to 36:1, or even 14:1 to 36:1). In some embodiments, methods for snaking the catalyst described herein comprises providing a catalyst comprising platinum, nickel, and tantalum, wherein the atomic ratio of platinum to nickel prior to dealloying is in a range from 0.05:1 to 0.43:1 (in some embodiments, in a range from 0.10:1 to 0.43:1, 0.15 to 0.43:1, 0.20:1 to 0.43:1, 0.25:1 to 0.43:1, 0.30:1 to 0.43:1, 0.35:1 to 0.43:1, 0.05:1 to 0.35:1, 0.05:1 to 0.30:1, 0.05:1 to 0.25:1, 0.05:1 to 0.20:1, 0.05:1 to 0.15:1, 0.05:1 to 0.10:1, 0.2:1 to 0.43:1, 0.25:1 to 0.4:1, or even 0.3:1 to 0.35:1). In some embodiments, the atomic ratio of platinum to nickel is 0.33:1.

In some embodiments, methods for making catalyst described herein comprises:
depositing platinum and nickel from a target comprising platinum and nickel to provide a first layer comprising platinum and nickel;
depositing tantalum from a target comprising tantalum to provide a layer comprising tantalum;
repeating the preceding two steps, in order, at least once (in some embodiments, repeating 2, 3, 4, 5, 10, 15, 20, 25, 50, 75, 100, 150, 200, 250, or even at least 275 times); and
dealloying at least one layer comprising platinum and nickel to remove at least a portion of the nickel from the layer. In some embodiments, there are pores with diameters in a range from 1 nm to 10 nm (in some embodiments, in a range from 2 nm to 8 nm, or even 3 nm to 7 nm) where the nickel was removed. In some embodiments, methods for making the catalyst describe herein comprises depositing platinum and nickel from a $Pt_3Ni_7$ target. In some embodiments, methods for making the catalyst describe herein comprises annealing the layers before dealloying. In some embodiments, the layers comprising platinum and nickel have a planar equivalent thickness in a range from 0.4 nm to 70 nm (in some embodiments, in a range from 0.4 nm to 1 nm, 0.4 nm to 5 nm, 1 nm to 25 nm, or even 1 nm to 10 nm) and layers comprising tantalum have a planar equivalent thickness in a range from 0.01 nm to 20 nm (in some embodiments, in a range from 0.01 nm to 10 nm, 0.01 nm to 5 nm, 0.02 nm to 2.5 nm, or even 0.02 nm to 1 am).

In some embodiments, methods for making catalyst described herein comprises:
depositing platinum from a target comprising platinum to provide a layer comprising platinum;
depositing nickel from a target comprising nickel to provide a layer comprising nickel;
depositing tantalum from a target comprising tantalum to provide a layer comprising tantalum;
repeating the preceding three steps, in order, at least once (in some embodiments, repeating 2, 3, 4, 5, 10, 15, 20, 25, 50, 75, 100, 150, 200, 250, or even at least 275 times); and
dealloying at least one layer comprising nickel to remove at least a portion of the nickel from the layer. In some embodiments, there are pores with diameters in a range from 1 nm to 10 nm (in some embodiments, in a range from 2 nm to 8 am, or even 3 nm to 7 am) where the nickel was removed. in some embodiments, methods for making the catalyst describe herein comprises annealing the layers before dealloying. In some embodiments, the layers comprising platinum and nickel have a planar equivalent thickness in a range from 0.4 nm to 70 nm (in some embodiments, in a range from 0.4 nm to 1 nm, 0.4 nm to 5 nm, 1 nm to 25 nm, or even 1 nm to 10 nm) and layers comprising tantalum have a planar equivalent thickness in a range from 0.01 nm to 20 nm (in some embodiments, in a range from 0.01 nm to 10 nm, 0.01 nm to 5 nm, 0.02 nm to 2.5 nm, or even 0.02 nm to 1 nm).

In some embodiments, methods for making catalyst described herein comprises:
depositing platinum from a target comprising platinum to provide a layer comprising platinum;
depositing nickel from a target comprising nickel to provide a layer comprising nickel;
optionally repeating at least one of the preceding to steps at least once (in some embodiments, repeating 2, 3, 4, 5, 10, 15, 20, 25, 50, 75, 100, 150, 200, 250, or even at least 275 times);
after completion of the preceding steps, depositing tantalum from a target comprising antalum to provide a layer comprising tantalum; and dealloying at least one layer comprising nickel to remove at least a portion of the nickel from the layer. In some embodiments, there are pores with diameters in a range from 1 nm to 10 nm (in some embodiments, in a range from 2 nm to 8 nm, or even 3 nm to 7 nm) where the nickel was removed. In some embodiments, methods for making the catalyst describe herein comprises annealing the layers before dealloying. In some embodiments, the layers comprising platinum and nickel have a planar equivalent thickness in a range from 0.4 nm to 70 nm (in some embodiments, in a range from 0.4 nm to 1 nm, 0.4 nm to 5 nm, 1 nm to 25 nm, or even 1 nm to 10 nm) and layers comprising tantalum have a planar equivalent thickness in a range from 0.01 nm to 20 nm (in some embodiments, in a range from 0.01 nm to 10 nm, 0.01 nm to 5 nm, 0.02 nm to 2.5 nm, or even 0.02 nm to 1 nm).

In some embodiments, a fuel cell membrane electrode assembly comprises the catalyst described herein. Catalysts described herein are useful, for example, in fuel cell membrane electrode assemblies (MEAs). "Membrane electrode assembly" refers to a layered sandwich of fuel cell materials comprising a membrane, anode and cathode electrode layers, and gas diffusion layers. Typically, the cathode catalyst layer comprises a catalyst described herein, although in some embodiments, the anode catalyst layer independently comprises a catalyst described herein. In some embodiments, the cathode and/or anode catalyst layer comprises whiskers with nanoporous oxygen reduction catalyst material described herein. In some embodiments, at least one of the anode or cathode catalyst has whiskers with nanoporous oxygen reduction catalyst material described herein. The "other catalyst layer" can be a conventional catalyst known in the art, and provided by techniques known in the art (e.g., U.S. Pat. No. 5,759,944 (Buchanan et al.), U.S. Pat. No. 5,068,161 (Keck et al.), and U.S. Pat. No. 4,447,506 (Luczak et al.)), the disclosures of which are incorporated herein by reference.

An MEA comprises, in order:
- a first gas distribution layer having first and second opposed major surfaces;
- an anode catalyst layer having first and second opposed major surfaces, the anode catalyst comprising a first catalyst;
- an electrolyte membrane;
- a cathode catalyst layer having first and second opposed major surfaces, the cathode catalyst comprising a second catalyst; and
- a second gas distribution layer having first and second opposed major surfaces.

Electrolyte membranes conduct reaction intermediate ions between the anode and cathode catalyst layers. Electrolyte membranes preferably have high durability in the electrochemical environment, including chemical and electrochemical oxidative stability. Electrolyte membranes preferably have low ionic resistance for the transport of the reaction intermediate ions, but are relatively impermeable barriers for other ions, electrons, and reactant species. In some embodiments, the electrolyte membrane is a proton exchange membrane (PEM), which conducts cations. In PEM fuel cells, the electrolyte membrane preferably conducts protons. PEMs are typically a partially fluorinated or perfluorinated polymer comprised of a structural backbone and pendant cation exchange groups, PEMs are available, for example, from E. I. du Pont de Nemours and Company, Wilmington, DE, under the trade designation "NAFION," Solvay, Brussels, Belgium, under the trade designation "AQUIVION;" 3M Company, St. Paul, MN, under the designation "3M PFSA MEMBRANE;" and Asahi Glass Co., Tokyo, Japan, under the trade designation "FLEMION."

A gas distribution layer generally delivers gas evenly to the electrodes and, in some embodiments, conducts electricity. It also provides for removal of water in either vapor or liquid form, in the case of a fuel cell. Gas distribution layers are typically porous to allow reactant and product transport between the electrodes and the flow field. Sources of gas distribution layers include carbon fibers randomly oriented to form porous layers, in the form of non-woven paper or woven fabrics. The non-woven carbon papers are available, for example, from Mitsubishi Rayon Co., Ltd., Tokyo, Japan, under the trade designation "GRAFIL U-105;" Toray Corp., Tokyo, Japan, under the trade designation "TORAY," AvCarb Material Solutions, Lowell, MA, under the trade designation "AVCARB;" SGL Group, the Carbon Company, Wiesbaden, Germany, under the trade designation "SIGRACET;" Freudenberg FCCT SE & Co. KG, Fuel Cell Component Technologies, Weinheim, Germany, under the trade designation "FREUDENBERG," and Engineered Fibers Technology (EFT), Shelton, CT, under the trade designation "SPECTRACARB GDL." The woven carbon fabrics or cloths are available, for example, from ElectroChem Inc., Woburn, MA, under the trade designations "EC-CC1-060" and "EC-AC-CLOTH," NuVant Systems Inc., Crown Point, IN, under the trade designations "ELAT-LT" and "ELAT," BASF Fuel Cell GmbH, North America, under the trade designation "E-TEK ELAT LT;" and Zoltek Corp., St. Louis, MO, under the trade designation "ZOLTEK CARBON CLOTH." The non-woven paper or woven fabrics can be treated to modify its hydrophobicity (e.g., treatment with a polytetrafluoroethylene (PTFE) suspension with subsequent drying and annealing). Gas dispersion layers often comprise a porous layer of sub-micrometer electronically-conductive particles (e.g., carbon), and a binder (e.g., PTFE). Although not wanting to be bound by theory, it is believed that gas dispersion layers facilitate reactant and product water transport between the electrode and the gas distribution layers.

A fuel cell is an electrochemical device that combines hydrogen fuel and oxygen from the air to produce electricity, heat, and water. Fuel cells do not utilize combustion, and as such, fuel cells produce little if any hazardous effluents. Fuel cells convert hydrogen fuel and oxygen directly into electricity, and can be operated at much higher efficiencies than internal combustion electric generators, for example.

Figure 2:
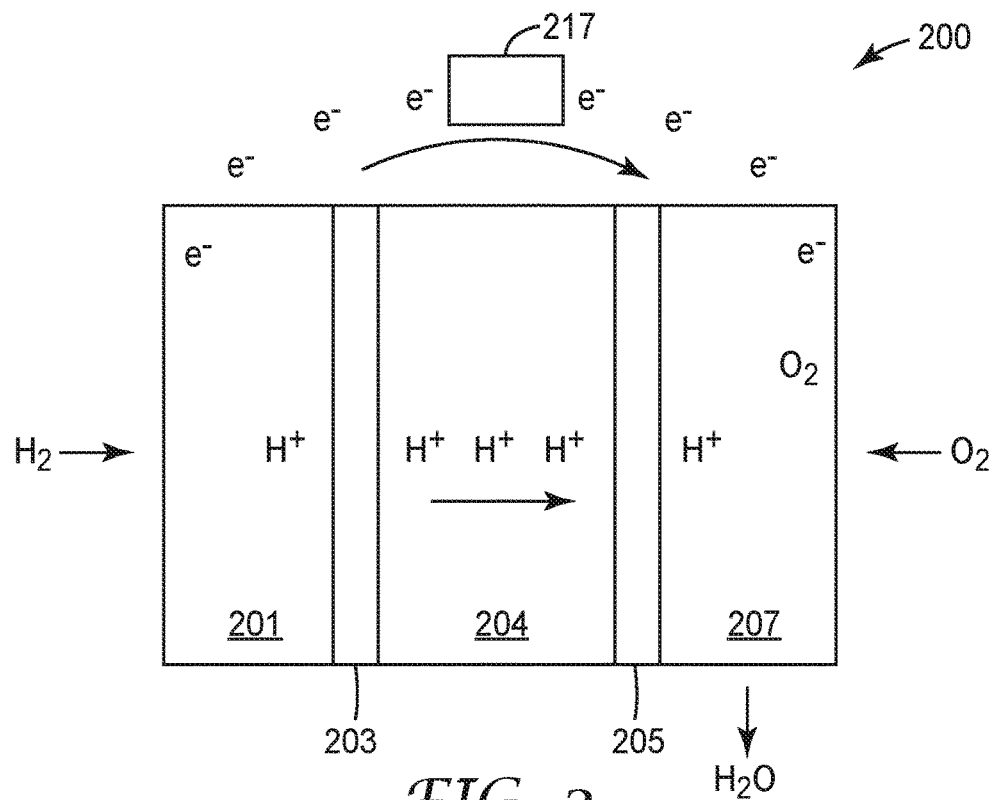
FIG. 2 is a schematic of an exemplary fuel cell.

Referring to FIG. 2, exemplary fuel cell 200 includes first gas distribution layer 201 adjacent to anode 203. Adjacent anode 203 is an electrolyte membrane 204. Cathode 205 is situated adjacent the electrolyte membrane 204, and second gas distribution layer 207 is situated adjacent cathode 205. In operation, hydrogen fuel is introduced into the anode portion of the fuel cell 200, passing through the first gas distribution layer 201 and over anode 203. At anode 203, the hydrogen fuel is separated into hydrogen ions ($H^+$) and electrons ($e^-$). Electrolyte membrane 204 permits only the hydrogen ions or protons to pass through electrolyte membrane 204 to the cathode portion of fuel cell 200. The electrons cannot pass through the electrolyte membrane 204 and, instead, flow through an external electrical circuit in the form of electric current. This current can power an electric load 217, such as an electric motor, or be directed to an energy storage device, such as a rechargeable battery. Oxygen flows into the cathode side of fuel cell 200 via second distribution layer 207. As the oxygen passes over cathode 205, oxygen, protons, and electrons combine to produce water and heat.

Exemplary Embodiments

1A. A nanoporous oxygen reduction catalyst material comprising at least 90 (in some embodiments, at least 95, 96, 97, 98, 99, 99.5, 99.6, 99.7, 99.8, 99.9, or even 100) atomic percent collectively Pt, Ni, and Ta.

2A. The nanoporous oxygen reduction catalyst material of Exemplary Embodiment 1A having pores with diameters in a range from 1 nm to 10 nm (in some embodiments, in a range from 2 nm to 8 nm, or even 3 nm to 7 nm).

3A. The nanoporous oxygen reduction catalyst material of any preceding A Exemplary Embodiment, comprising in a range from 52.7 to 61.9 atomic percent Pt, in a range from 34.4 to 43.3 atomic percent Ni, and in a range from 0.2 to 10.5 atomic percent Ta (in some embodiments in a range from 52.7 to 59.6 atomic percent Pt, in a range from 34.4 to 43.3 atomic percent Ni, and in a range from 0.3 to 10.5 atomic percent Ta; in a range from 52.7 to 59.6 atomic percent Pt, in a range from 38.8 to 43.3 atomic percent Ni, and in a range from 0.3 to 4.0 atomic percent Ta; in a range from 59.0 to 59.6 atomic percent Pt, in a range from 38.8 to 40.7 atomic percent Ni, and in a range from 0.3 to 1.8 atomic percent Ta; in a range from 52.7 to 59.6 atomic percent Pt, in a range from 34.4 to 43.3 atomic percent Ni, and in a range from 0.8 to 10.5 atomic percent Ta; in a range from 52.7 to 59.6 atomic percent Pt, in a range from 38.8 to 43.3 atomic percent Ni, and in a range from 0.8 to 4.0 atomic percent Ta; in a range from 59.4 to 59.6 atomic percent Pt, in a range from 38.8 to 39.5 atomic percent Ni, and in a range from 0.8 to 1.8 atomic percent Ta; in a range from 52.7 to 59.4 atomic percent Pt, in a range from 34.4 to 43.3 atomic percent Ni, and in a range from 1.8 to 10.5 atomic percent Ta; and in a range from 52.7 to 59.4 atomic percent Pt, in a range from 38.8 to 43.3 atomic percent Ni, and in a range from 1.8 to 4.0 atomic percent Ta), wherein the total atomic percent of Pt, Ni, and Ta equals 100.

4A. The nanoporous oxygen reduction catalyst material of any preceding A Exemplary Embodiment in the form of at least one nanoporous layer comprising platinum and nickel.

5A. The nanoporous catalyst of Exemplary Embodiment 4A, wherein the nanoporous layers comprising platinum and nickel have a planar equivalent thicknesses up to 600 nm (in some embodiments, up to 575 nm, 550 nm, 500 nm, 400 nm, 300 nm, 200 nm, 100 nm, 75 nm, 50 nm, 25 nm, 10 nm, 5 nm, 2.5 nm, 1 nm, or even up to two monolayers (e.g., 0.4 nm); in some embodiments, in a range from 0.4 nm to 600 nm, 0.4 nm to 500 nm, 1 nm to 500 nm, 5 nm to 500 nm, 10 nm to 500 nm, 10 nm to 400 nm, or even 40 nm to 300 nm).

6A. The nanoporous oxygen reduction catalyst material of any of Exemplary Embodiments 4A or 5A, wherein a there is a layer comprising tantalum on at least one of the nanoporous layers comprising platinum and nickel.

7A. The nanoporous oxygen reduction catalyst material of Exemplary Embodiment 6A, wherein the layer comprising tantalum has a planar equivalent thickness up to 50 nm (in some embodiments, up to 45 nm, 40 nm, 35 nm, 30 nm, 25 nm, 20 nm, 15 nm, 10 nm, 5 nm, 4 nm, 3 nm, 2 nm, 1 nm, 0.5 nm, a monolayer (e.g., 0.2 nm) or even less than a monolayer (e.g., 0.01 nm); in some embodiments, in a range from 0.01 nm to 50 nm, 1 nm to 50 nm, 5 nm to 40 nm, 5 nm to 35 nm, 0.5 nm to 20 nm, 0.5 nm to 10 nm, 0.5 nm to 3.7 nm, 0.5 nm to 1.8 nm, 0.9 nm to 20 nm, 0.9 nm to 10 nm, 0.9 nm to 3.7 nm, 0.9 nm to 1.8 nm, 1.8 nm to 20 nm, 1.8 nm to 10 nm, or even 1.8 nm to 3.7 nm).

8A. The nanoporous oxygen reduction catalyst material of any preceding A Exemplary Embodiment having an exposed tantalum surface layer (in some embodiments, the exposed tantalum surface layer is a sub-monolayer of tantalum).

9A. The nanoporous oxygen reduction catalyst material of any preceding A Exemplary Embodiment, wherein the weight ratio of platinum to tantalum is in a range from 2:1 to 250:1 (in some embodiments, in a range from 5:1 to 15:1, 3:1 to 30:1, 30:1 to 250:1, 15:1 to 250:1, 2:1 to 108:1, 5:1 to 108:1, 13:1 to 108:1, 27:1 to 54:1, 5:1 to 54:1 1.3:1 to 54:1, 27:1 to 54:1, 5:1 to 27:1 , or even from 13:1 to 27:1).

10A. A catalyst comprising nanostructured elements comprising microstructured support whiskers having an outer surface at least partially covered by the nanoporous oxygen reduction catalyst material of any preceding A Exemplary Embodiment.

11A fuel cell membrane electrode assembly comprising the catalyst of Exemplary Embodiment 10A.

1B. A method comprising:
   providing an oxygen reduction catalyst material comprising Pt, Ni, and Ta, wherein there are layers comprising platinum and nickel; and
   dealloying at least some layers comprising platinum and nickel to remove at least a portion of the nickel from at least one layer to provide the nanoporous oxygen reduction catalyst material of any of Exemplary Embodiments 1A to 10A. In some embodiments, there are pores with diameters in a range from 1 nm to 10 nm (in some embodiments, in a range from 2 nm to 8 nm, or even 3 nm to 7 nm) where the nickel was removed.

2B. The method of Exemplary Embodiment 1B, further comprising annealing the catalyst before dealloying.

3B. The method of any preceding B Exemplary Embodiment, further comprising depositing platinum and nickel from a target comprising platinum and nickel and depositing tantalum from a target comprising tantalum.

4B. The method of Exemplary Embodiment 3B, wherein the target is a $Pt_3Ni_7$ target.

5B. A method of making the catalyst of either Exemplary Embodiment 1B or 2B, further comprising depositing platinum from a target comprising platinum, depositing nickel from a target comprising nickel, and depositing tantalum from a target comprising tantalum.

6B. The method of any preceding B Exemplary Embodiment, wherein layers of the oxygen reduction catalyst material, before dealloying, comprising platinum and nickel have a planar equivalent thickness in a range from 0.4 nm to 580 nm (in some embodiments, in a range from 0.4 nm to 72 nm) and layers comprising tantalum have a planar equivalent thickness in a range from 0.01 nm to 32 nm (in some embodiments, in a range from 0.01 nm to 16 nm, or even a range from 0.01 nm to 2 nm).

7B. The method of any preceding B Exemplary Embodiment, wherein the weight ratio of platinum to tantalum prior to dealloying is in a range from 6:1 to 329:1 (in some embodiments, in a range from 6:1 to 187:1, 14:1 to 187:1, 36:1 to 187:1, 6:1 to 78:1, 14:1 to 78:1, 36:1 to 78:1, 36:1 to 78:1, 6:1 to 36:1, or even 14:1 to 36:1).

8B. The method of any preceding B Exemplary Embodiment, wherein the atomic ratio of platinum to nickel prior to dealloying is in a range from 0.05:1 to 0.43:1 (in some embodiments, in a range from 0.10:1 to 0.43:1, 0.15 to 0.43:1, 0.20:1 to 0.43:1, 0.25:1 to 0.43:1, 0.30:1 to 0.43:1, 0.35:1 to 0.43:1, 0.05:1 to 0.35:1, 0.05:1 to 0.30:1, 0.05:1 to 0.25:1,0.05:1 to 0.20:1, 0.05:1 to 0.15:1, 0.05:1 to 0.10:1, 0.2:1 to 0.43:I, 0.25:1 to 0.4:1, or even 0.3:1 to 0.35:1). In some embodiments, the atomic ratio of platinum to nickel is 0.33:1.

1C. A method of making the catalyst of any of Exemplary Embodiments 1A to 10A, the method comprising:

depositing platinum and nickel from a target comprising platinum and nickel to provide a first layer comprising platinum and nickel;

depositing tantalum from a target comprising tantalum to provide a layer comprising tantalum;

repeating the preceding two steps, in order, at least once (in some embodiments, repeating 2, 3, 4, 5, 10, 15, 20, 25, 50, 75, 100, 150, 200, 250, or even at least 275 times); and dealloying at least one layer comprising platinum and nickel to remove at least a portion of the nickel from the layer. In some embodiments, there are pores with diameters in a range from 1 nm to 10 nm (in some embodiments, in a range from 2 nm to 8 nm, or even 3 nm to 7 nm) where the nickel was removed.

2C. The method of Exemplary Embodiment 1C, wherein the target is a $Pt_3Ni_7$ target.

3C. The method of any preceding C Exemplary Embodiment, further comprising annealing the layers before dealloying.

4C. The method of any preceding C Exemplary Embodiment, wherein layers comprising platinum and nickel have a planar equivalent thickness in a range from 0.4 nm to 70 nm (in some embodiments, in a range from 0.4 nm to 1 nm, 0.4 nm to 5 nm, 1 nm to 25 nm, or even 1 nm to 10 nm) and layers comprising tantalum have a planar equivalent thickness in a range from 0.01 nm to 20 nm (in some embodiments, in a range from 0.01 nm to 10 nm, 0.01 nm to 5 nm, 0.02 nm to 2.5 nm, or even 0.02 nm to 1 nm).

1D. A method of making the catalyst of any of Exemplary Embodiments 1A to 10A, the method comprising:

depositing platinum from a target comprising platinum to provide a layer comprising platinum;

depositing nickel from a target comprising nickel to provide a layer comprising nickel;

depositing tantalum from a target comprising tantalum to provide a layer comprising tantalum;

repeating the preceding three steps, in order, at least once (in some embodiments, repeating 2, 3, 4, 5, 10, 15, 20, 25, 50, 75, 100, 150, 200, 250, or even at least 275 times); and dealloying at least one layer comprising nickel to remove at least a portion of the nickel from the layer. In some embodiments, there are pores with diameters in a range from 1 nm to 10 nm (in some embodiments, in a range from 2 nm to 8 nm, or even 3 nm to 7 nm) where the nickel was removed.

2D. The method of Exemplary Embodiment 2D, further comprising annealing the layers before dealloying.

3D. The method of any preceding D Exemplary Embodiment, wherein layers comprising platinum and nickel have a planar equivalent thickness in a range from 0.4 nm to 70 nm (in some embodiments, in a range from 0.4 nm to 1 nm, 0.4 nm to 5 nm, 1 nm to 25 nm, or even 1 nm to 10 nm) and layers comprising tantalum have a planar equivalent thickness in a range from 0.01 nm to 20 nm (in some embodiments, in a range from 0.01 nm to 10 nm, 0.01 nm to 5 nm, 0.02 nm to 2.5 nm, or even 0.02 nm to 1 nm).

1E. A method of making the catalyst of any of Exemplary Embodiments 1A to 10A, the method comprising:

depositing platinum from a target comprising platinum to provide a layer comprising platinum;

depositing nickel from a target comprising nickel to provide a layer comprising nickel;

optionally repeating at least one of the preceding to steps at least once (in some embodiments, repeating 2, 3, 4, 5, 10, 15, 20, 25, 50, 75, 100, 150, 200, 250, or even at least 275 times);

after completion of the preceding steps, depositing tantalum from a target comprising tantalum to provide a layer comprising tantalum; and dealloying at least one layer comprising nickel to remove at least a portion of the nickel from the layer. In some embodiments, there are pores with diameters in a range from 1 nm to 10 nm (in some embodiments, in a range from 2 nm to 8 nm, or even 3 nm to 7 nm) where the nickel was removed.

2E. The method of Exemplary Embodiment 1E, further comprising annealing the layers before dealloying.

3E. The method of any preceding E Exemplary Embodiment, wherein layers comprising platinum and nickel have a planar equivalent thickness in a range from 0.4 nm to 70 nm (in some embodiments, in a range from 0.4 nm to 1 nm, 0.4 nm to 5 nm, 1 nm to 25 nm, or even 1 nm to 10 nm) and layers comprising tantalum have a planar equivalent thickness in a range from 0.01 nm to 20 nm (in some embodiments, in a range from 0.01 am to 10 nm, 0.01 nm to 5 nm, 0.02 nm to 2.5 nm, or even 0.02 nm to 1 nm).

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Preparatory Example

Microstructured whiskers employed as catalyst supports were made according to the process described in U.S. Pat. No. 5,338,430 (Parsonage et al.), U.S. Pat. No. 4,812,352 (Debe), and U.S. Pat. No. 5,039,561 (Debe), incorporated herein by reference, using as substrates the microstructured catalyst transfer substrates (or MCTS) described in U.S. Pat. No. 6,136,412 (Spiewak et al.), also incorporated herein by reference. Perylene red pigment (i.e., N,N'-di(3,5-xylyl) perylene-3,4:9,10-bis(dicarboximide)) (C.I. Pigment Red 149, also known as "PR149", obtained from Clariant, Charlotte, NC) was sublimation vacuum coated onto MCTS with a nominal thickness of 200 nm, after which it was annealed. After deposition and annealing, highly oriented crystal structures were formed with large aspect ratios, controllable lengths of about 0.5 to 2-micrometer, widths of about 0.03-0.05 micrometer and areal number density of about 30 whiskers per square micrometer, oriented substantially normal to the underlying substrate.

Nanostructured thin film (NSTF) catalyst layers were prepared by sputter coating catalyst films sequentially using a DC-magnetron sputtering process onto the layer of microstructured whiskers. A vacuum sputter deposition system was used with typical Ar sputter gas pressures of about 5 mTorr (0.66 Pa), and individual 12.7 cm×38.1 cm (5-inch× 15-inch) rectangular Pt and Ni sputter targets were used. The coatings were deposited by using ultra high purity Ar as the sputtering gas.

A single Pt layer with planar equivalent thickness of about 1.49 nm was first deposited onto the whiskers on MCTS from a pure Pt target. Next, a single Ni layer with planar equivalent thickness of about 3.24 nm was deposited from a pure Ni target. The Pt and Ni deposition processes were repeated 50 times, resulting in an areal loading of about 0.080 $mgp_{Pt}/cm^2$. The targeted individual Pt and Ni layer thicknesses were calculated to yield an overall composition of 25 at. % Pt and 75 at. % Ni for the combined layers, as summarized in Table 1, below.

TABLE 1

| Example | Pt Loading, microg/cm² | Ni Loading, microg/cm² | Ta Loading, microg/cm² | Pt Content, at. % | Ni Content, at. % | Ta Content, at. % | Pt:Ta Weight Ratio |
|---|---|---|---|---|---|---|---|
| Preparatory Example | 80 | 73 | 0 | 24.8 | 75.2 | 0 | Infinite |
| Comparative Example A | 80 | 73 | 0 | 24.8 | 75.2 | 0 | Infinite |
| Comparative Example B | 105 | 73 | 0 | 30 | 70 | 0 | Infinite |
| Comparative Example C | 125 | 87 | 0 | 30 | 70 | 0 | Infinite |
| 1 | 80 | 73 | 0.74 | 24.73 | 75.02 | 0.25 | 108 |
| 2 | 80 | 73 | 1.49 | 24.67 | 74.83 | 0.5 | 54 |
| 3 | 80 | 73 | 3 | 24.55 | 74.46 | 0.99 | 27 |
| 4 | 80 | 73 | 6.06 | 24.3 | 73.71 | 1.98 | 13 |
| 5 | 80 | 73 | 15.62 | 23.57 | 71.47 | 4.96 | 5 |
| 6 | 80 | 73 | 32.98 | 22.33 | 67.74 | 9.93 | 2 |

A total of about 50 linear feet of catalyzed whiskers on MCTS substrate were generated. The Preparatory Example material was used as input material for Comparative Example A and Examples 1-6, described below.

Representative areas of the electrocatalyst were analyzed for bulk composition using X-Ray Fluorescence spectroscopy (XRF). Representative catalyst samples were evaluated on MCTS using a wavelength dispersive X-ray fluorescence spectrometer (obtained under the trade designation "PRIMUS II" from Rigaku Corporation, Tokyo, Japan) equipped with a rhodium (Rh) X-ray source, a vacuum atmosphere, and a 20-mm diameter measurement area. Each sample was analyzed three times to obtain the average and standard deviation for the measured Pt and Ni signal intensities, which are proportional to loading. The electrocatalyst's Pt and Ni loadings were determined by comparing their measured XRF intensities to the XRF intensities obtained with standard NSTF electrocatalysts containing Pt and. Ni with known areal loadings. From the XRF-determined Pt and Ni loading, the catalyst's composition was calculated and summarized in Table 2, below.

tube furnace (obtained under the trade designation "LINDBERG BLUE M" from Thermo Electron Corporation, Waltham, MA) and heated to 430° C. under flowing $H_2$. After about a 20-minute temperature ramp, the catalyst was annealed for about 3 hours at temperature, and then allowed to cool to room temperature over about a 3-hour period. After cooling to room temperature, the tube furnace was purged with nitrogen for about 15 minutes to remove any remaining $H_2$, after which the catalyst on the substrate was removed from the furnace.

After annealing, the Comparative Example A catalyst was electrochemically dealloyed. The electrocatalyst on MCTS was placed in contact with a gold-plated mesh electrode and installed into a custom laboratory electrochemical dealloying cell. The cell's counter electrode consisted of platinized titanium. The cell's reference electrode was an $Hg/HgSO_4$ electrode. Aqueous sulfuric acid solution (1 M, RT, aq.) was the electrolyte. The catalyst's potential was cycled several times between 0 and 1.25 V vs. standard hydrogen electrode with a scan rate of 50 mV/sec. Without being bound by theory, electrochemical dealloying can form nanoscale pores

TABLE 2

| Example | Pt Loading, microg/cm² | Ni Loading, microg/cm² | Ta XRF Intensity, kiloCounts/sec | Pt Content, at. % | Ni Content, at. % | Ta Content, at. % | Pt:Ta Weight Ratio |
|---|---|---|---|---|---|---|---|
| Preparatory Example | 81.3 | 72.9 | Not Measured | 25.13 | 74.87 | 0.00 | Infinite |
| Comparative Example A | 81.3 | 72.9 | Not Measured | 25.13 | 74.87 | 0.00 | Infinite |
| Comparative Example B | 104 | 73 | Not Measured | 30.01 | 69.99 | 0.00 | Infinite |
| Comparative Example C | 129 | 87 | Not Measured | 30.85 | 69.15 | 0.00 | Infinite |
| 1 | 81.3 | 70.5 | 0.46 | 25.70 | 74.05 | 0.25 | 110 |
| 2 | 80.6 | 70.2 | 0.72 | 25.55 | 73.94 | 0.51 | 54 |
| 3 | 81 | 70.5 | 1.42 | 25.43 | 73.55 | 1.02 | 27 |
| 4 | 75.6 | 71.1 | 2.82 | 23.74 | 74.20 | 2.05 | 12 |
| 5 | 81.6 | 70 | 7.09 | 24.65 | 70.26 | 5.09 | 5 |
| 6 | 81.5 | 69.4 | 15.07 | 23.44 | 66.33 | 10.23 | 2 |

Comparative Example A

Comparative Example A was the Preparatory Example, without any additional deposition. Typically, two or more nominally identical electrocatalyst samples of a given type were fabricated and characterized as described below.

The Preparatory Example electrocatalyst was thermally annealed. Electrocatalyst on MCTS was placed into a quartz within the electrocatalyst thin film and can corrosively remove a portion of relatively less stable metals, such as nickel, from the electrocatalyst. Based on previous development experience with similar catalysts, annealed and dealloyed PtNi electrocatalyst with this composition and loading on NSTF supports is expected to form nano-scale pores throughout the thickness of the electrocatalyst coating. As compared to structurally homogenous electrocatalysts of similar areal catalyst loading and composition on NSTF supports, nanoporous PEMFC electrocatalysts may have higher specific area, thereby reducing cost. Nanoporous catalysts are comprised of numerous interconnected nanoscale catalyst ligaments, and the surface area of a nanoporous material depends upon the diameter and volumetric number density of the nanoscale ligaments. Surface area is expected to increase as the nanoscale ligaments diameter decreases and the volumetric number density increases.

Comparative Example A catalyst and NSTF PtCoMn coated anode catalyst whiskers (0.05 $mg_{Pt}/cm^2$, $Pt_{69}Co_{28}Mn_3$) on MCTS were then transferred to either side of a 24-micrometer thick proton exchange membrane (obtained under the trade designation "3M PFSA 825EW" (neat) from 3M Company, St. Paul, MN), using a laminator (obtained under the trade designation "HL-101" from Cheminstruments, Inc., West Chester Township, OH) to form a catalyst coated membrane (CCM). The three-layer stack-up was hand fed into the laminator with hot nip rolls at 270° F. (132° C.), 150 psi (1.03 MPa) nip, and rotating at the equivalent of 0.5 fpm (0.25 cm/s). Immediately after lamination, the MCTS layers were peeled back, leaving the catalyst coated whiskers embedded into either side of the PEM. The CCM was installed with identical gas diffusion layers (obtained under the trade designation "3M 2979 GAS DIFFUSION LAYERS" from 3M Company) on the anode and cathode in 50 cm² active area test cells (obtained under the trade designation "50 CM² CELL HARDWARE" from Fuel Cell Technologies, Inc., Albuquerque, NM) with quad-serpentine flow fields with gaskets selected to give 10% compression of the gas diffusion layers. Comparative Example A catalyst was evaluated as the fuel cell cathode.

After assembly, the test cells were connected to a test station (obtained under the trade designation "SINGLE FUEL CELL TEST STATION" from Fuel Cell Technologies, Inc.). The MEA was then operated for about 40 hours under a conditioning protocol to achieve apparent steady state performance. The protocol consisted of repeated cycles of operational and shutdown phases, each about 40 and 45 minutes in duration, respectively. In the operational phase, the MEA was operated at 75° C. cell temperature, 70° C. dewpoint, 101/101 kPaA $H_2$/Air, with constant flow rates of 800 and 1800 standard cubic centimeters per minute (sccm) of $H_2$ and air, respectively. During the 40-minute operational phase, the cell voltage was alternated between 5-minute-long polarization cycles between 0.85 V and 0.25 V and 5-minute-long potential holds at 0.40 V. During the 45-minute shutdown phase, the cell potential was set to open circuit voltage, $H_2$ and air flows to the cell were halted, and the cell temperature was cooled towards room temperature while liquid water was injected into the anode and cathode cell inlets at 0.26 g/min. and 0.40 g/min., respectively.

After conditioning the MEAs, the electrocatalysts were characterized for relevant beginning of life (BOL) characteristics, including catalyst mass activity, specific surface area, and specific activity, described as follows, using the test station in conjunction with a potentiostat (obtained under the trade designation "MPG-205" from Bio-Logic SAS, Seyssinet-Pariset, France).

The cathode oxygen reduction reaction (ORR) absolute activity was measured with saturated 150 kPaA $H_2/O_2$, 80° C. cell temperature for 1200 seconds at 900 mV vs. the 100% $H_2$ reference/counter electrode. The ORR absolute activity ($A/cm^2$ or $mA/cm^2$) was obtained by adding the measured current density after 1050 seconds of hold time and the electronic shorting and hydrogen crossover current densities, estimated from 2 mV/s cyclic voltammograms measured with $N_2$ fed to the working electrode instead of $O_2$. The electrocatalyst mass activity, a measure of the catalyst activity per unit precious metal content, is calculated by dividing the corrected ORR absolute activity ($A/cm^2_{planar}$) by the cathode Pt areal loading ($mg/cm^2$) to obtain the mass activity ($A/mg_{Pt}$). The mass activity of Comparative Example A is listed in Table 3, below.

TABLE 3

| Example | Ta Content, at. % | Samples Evaluated | Mass Activity, A/mg | Specific Area, m²/g | Specific Activity, mA/cm²-Pt |
| --- | --- | --- | --- | --- | --- |
| Comparative Example A | 0.00 | 2 | 0.34 ± 0.03 | 16.0 ± 0.4 | 2.12 ± 0.15 |
| Comparative Example B | 0.00 | 1 | 0.29 | 13.0 | 2.25 |
| Comparative Example C | 0.00 | 2 | 0.30 ± 0.02 | 13.8 ± 0.2 | 2.15 ± 0.10 |
| Comparative Example D | 0.00 | 1 | 0.32 | 17.5 | 1.87 |
| 1 | 0.25 | 2 | 0.29 ± 0.02 | 15.1 ± 0.3 | 1.92 ± 0.08 |
| 2 | 0.50 | 2 | 0.29 ± 0.00 | 14.4 ± 0.4 | 2.02 ± 0.08 |
| 3 | 0.99 | 2 | 0.30 ± 0.04 | 14.9 ± 0.8 | 2.00 ± 0.35 |
| 4 | 1.98 | 2 | 0.28 ± 0.01 | 15.8 ± 0.8 | 1.80 ± 0.02 |
| 5 | 4.96 | 1 | 0.24 | 15.6 | 1.55 |
| 6 | 9.93 | 1 | 0.25 | 15.9 | 1.54 |

The cathode catalyst surface enhancement factor (SEF. $m^2_{Pt}/m^2_{planar}$ or analogously $cm^2_{Pt}/cm^2_{planar}$) was measured via cyclic voltammetry (100 mV/s, 0.65 V-0.85 V, average of 100 scans) under saturated 101 kilopascals absolute pressure (kPaA) $H_2/N_2$ and 70° C. cell temperature. The SEF was estimated by taking the average of the integrated hydrogen underpotential deposition ($H_{UPD}$) charge (μC/$cm^2_{planar}$) for the oxidative and reductive waves and dividing by 220 $\mu C/cm^2_{Pt}$. The electrocatalyst's specific surface area ($m^2_{Pt}/g_{pt}$), a measure of catalyst dispersion, was calculated by dividing the SEF ($m^2_{Pt}/m^2_{planar}$) by the areal Pt loading ($g_{Pt}/m^2_{planar}$). The specific area is reported in Table 3, above.

The cathode catalyst oxygen reduction specific activity was calculated by dividing the corrected ORR absolute activity ($A/cm^2_{planar}$) by the SEF ($cm^2_{Pt}/cm^2_{planar}$) to obtain the specific activity expressed in ($A/cm^2_{Pt}$), or after unit conversion as $mA/cm^2_{Pt}$ (multiply ($A/cm^2$) by 1000 mA per A). The specific activity is reported in Table 3, above. The specific activity is a measure of catalyst activity per unit catalyst surface area, a measure of fundamental catalyst activity.

Comparative Example B

Comparative Example B was fabricated similarly to the Preparatory Example, except that the catalyst was deposited using a single target comprising a $Pt_3Ni_7$ alloy instead of separate Pt and Ni targets, and the areal Pt loading was targeted to be 0.105 $mg_{Pt}/cm^2$ instead of 0.08 $mg_{Pt}/cm^2$. The targeted composition and loading is summarized in Table 1, above. After deposition, Comparative Example B was dealloyed using a similar procedure as described for Comparative Example A, except that the catalyst was dealloyed for 50 cycles rather than 100 cycles. After dealloying, the Comparative Example B catalyst was analyzed for Pt and Ni content by XRF. Post-dealloyed catalyst composition is listed in Table 4, below.

Comparative Example C

Comparative Example C was prepared and characterized similarly to Comparative Example B, except that the Pt areal loading was 0.129 $mg_{Pt}/cm^2$, the sample was dealloyed with different scanning conditions, and the composition after dealloying was not measured. After deposition, the catalyst was dealloyed with 500 scans between 0.05 and 1.4V vs. SHE with a scan rate of 500 mV/s. The targeted Pt areal loading and composition are summarized in Table 1, above. The XRF-determined Pt areal loading and composition are summarized in Table 2, above. The mass activity, specific area, and specific activity after conditioning are summarized in Table 3, above. The changes in mass activity, specific area, and specific activity after the AST are summarized in Table 5, above.

TABLE 4

| Example | Pt Loading, microg/cm² | Ni Loading, microg/cm² | Ta XRF Intensity, kiloCounts/sec | Ta Loading, microg/cm² | Pt Content, at. % | Ni Content, at. % | Ta Content, at. % | Pt:Ta Weight Ratio |
|---|---|---|---|---|---|---|---|---|
| Comparative Example B | 107.3 | 25.8 | Not Measured | 0 | 55.59 | 44.41 | 0.00 | INFINTE |
| 1 | 87.1 | 18.1 | 0.29 | 0.47 | 58.95 | 40.71 | 0.34 | 187 |
| 2 | 87.7 | 17.5 | 0.54 | 1.12 | 59.64 | 39.54 | 0.82 | 78 |
| 3 | 87 | 17.1 | 1.16 | 2.45 | 59.40 | 38.80 | 1.80 | 36 |
| 4 | 79.4 | 19.6 | 2.61 | 5.61 | 52.73 | 43.25 | 4.02 | 14 |
| 5 | 86.3 | 16.2 | 6.95 | 15.31 | 55.09 | 34.37 | 10.54 | 6 |
| 6 | 86.4 | 15.9 | 0.12 | 0.26 | 61.93 | 37.87 | 0.20 | 329 |

After dealloying, Comparative Example B was evaluated for mass activity, specific area, and specific activity using the procedure as described for Comparative Example A. The mass activity, specific area, and specific activity are summarized in Table 3, above.

The durability of Comparative Example B was then evaluated using an accelerated stress test (AST). The MEA was operated at 80° C. cell temperature, with the cathode exposed to nitrogen (80° C. dewpoint, 100 kPaA, constant flow 1800 sccm) and the anode exposed to $H_2$ (80° C. dewpoint, 100 kPaA, constant flow 800 sccm). Using a potentiostat (obtained under the trade designation "SOLARTRON 1470E" from Solartron Analytical, Leicester, England), the cathode electrode potential was cycled 30,000 between 0.60 and 1.00V vs. the $H_2$ anode electrode reference potential at 50 mV/s using a triangle wave. After the 30,000 cycles were complete, the MEA was reconditioned and cathode mass activity, surface area, and specific activity was again measured. The changes in mass activity, specific area, and specific activity after the AST are listed in Table 5, below.

TABLE 5

| Example | Mass Activity Change, % | Specific Area Change, % | Specific Activity Change, % |
|---|---|---|---|
| Comparative Example B | −67 | −29 | −54 |
| Comparative Example C | −64 ± 4 | −39 ± 2 | −40 ± 5 |
| Comparative Example D | −62 | −47 | −30 |
| Example 3 | −51 ± 1 | −38 ± 4 | −21 ± 4 |

Comparative Example D

Comparative Example D was prepared and characterized similarly to Comparative Example A, except that the deposition conditions differed, the catalyst was not dealloyed after annealing, and durability was assessed using the AST. The targeted Pt areal loading was 0.12 $mg_{Pt}/cm^2$ and the target Pt content was 30 at. % Pt. The actual Pt areal loading was 0.122 $mg_{Pt}/cm^2$ and the actual Pt content was 30.4 at. % Pt.

The targeted Pt areal loading and composition are summarized in Table 1, above. The XRF-determined Pt areal loading and composition are summarized in Table 2, above. The mass activity, specific area, and specific activity after conditioning are summarized in Table 3, above. The changes in mass activity, specific area, and specific activity after the AST are summarized in Table 5, above.

Example 1

Example 1 catalyst was prepared and characterized similarly to Comparative Example A, except that prior to thermal annealing, tantalum was deposited onto the surface of the Preparatory Example catalyst and additional XRF characterization was conducted to estimate the tantalum content. Additionally, the durability of Example 1 was not assessed.

A vacuum sputter deposition system was used to deposit tantalum with typical Ar sputter gas pressures of about 5 mTorr (0.66 Pa), and an individual 12.7 cm×38.1 cm (5-inch×15-inch) rectangular Ta sputter target. Prior to sputter depositing tantalum onto the Preparatory Example catalyst, gravimetric calibration of the tantalum sputter deposition was conducted to determine areal tantalum loadings as a function of target power at fixed web speed. Table 6, below, summarizes the calibration data generated, and this data was used to estimate deposition conditions (target power, web speed, and number of passes) needed to deposit specific areal loadings of tantalum.

TABLE 6

| Sample ID | Power, kW | Speed, mpm (fpm) | No. Passes | Average Load, microg/cm² | Loading Standard Deviation, microg/cm² |
|---|---|---|---|---|---|
| Calib. 1 | 0.25 | 18.3 (60) | 50 | 10.7 | 0.3 |
| Calib. 2 | 0.50 | 18.3 (60) | 50 | 20.7 | 1.6 |
| Calib. 3 | 1.00 | 18.3 (60) | 50 | 39.8 | 0.4 |
| Calib. 4 | 1.50 | 18.3 (60) | 50 | 59.2 | 0.4 |

Using the Table 6 calibration data, deposition conditions were determined which would result in 0.74 microgram/cm² tantalum. 0.74 microgram/cm² is about 0.45 nm thick on a planar equivalent basis, based on the density of Ta, 16.4 g/cm³. A 2-lineal foot section of the Preparatory Example catalyst was loaded into the sputter system, and tantalum coating was deposited by using ultra high purity Ar as the sputtering gas. Example 1 catalyst was then removed from the deposition system, annealed, dealloyed, and characterized similarly to Comparative Example A. Without being bound by theory, the Ta may be metallic or in an oxide phase.

Example 1 catalyst composition prior to dealloying, based on the measured XRF Pt loading, XRF Ni loading, and targeted Ta areal loading, is summarized in Table 2, above. Table 2, above, also summarizes the measured XRF Ta intensity for Example 1. Example 1 contained 0.74 microgram/cm² Ta, determined by the gravimetric calibration in Table 6, above, and this loading of tantalum yielded an XRF intensity of 0.46 kilocount/second. The ratio of Ta areal loading to Ta XRF intensity is 1.61 microgram/cm² per kilocount/second. The composition of Example 1 prior to dealloying was 25.70 at. % Pt, 74.05 at. % Ni, and 0.25 at. % Ta. The Pt to Ta weight ratio of Example 1 prior to dealloying, 110, and was determined by dividing the XRF measured Pt loading from Table 2 (above), 81.3 microgram/cm², by the Ta areal loading from Table I (above), 0.74 microgram/cm².

Example 1 catalyst composition after annealing and dealloying is summarized in Table 4, above. Table 4, above, summarizes the XRF measured Pt loading, measured Ni loading, and measured Ta intensity. The Ta areal loading in Table 4, 0.47 microgram/cm² was determined by multiplying the measured XRF intensity (0.29 kilocount per second) by the Ta areal loading to XRF intensity determined above (1.61 microgram/cm² per kilocount/second). Dealloying resulted in essentially no change in the Pt loading, decreased the Ni loading from 70.5 to 18.1 micrograms/cm², and decreased the Ta areal loading from 0.74 to 0.47 microgram/cm². After dealloying the Pt content was 58.95 at. %, the Ni content was 40.71 at. %, and the Ta content was 0.34 at. %. The Pt to Ta weight ratio was 187.

The mass activity, specific area, and specific activity of Example 1 after annealing, dealloying, and conditioning are summarized in Table 3, above.

Example 2-6

Example 2-6 catalyst was prepared and characterized similarly to Example 1, but the surface tantalum content was varied. The targeted tantalum areal loadings were 1.49, 3.00, 6.06, 15.62, and 32.98 microgram(s)/cm² for Examples 2-6, respectively. The Ta thicknesses were 0.91, 1.82, 3.70, 9.52, and 20.11 nm for Examples 2-6, respectively. The targeted tantalum contents are 0.25, 0.50, 0.99, 1.98, 4.96, and 9.93 at. %, respectively, as summarized in Table 1, above. The targeted Pt to Ta weight ratios of Examples 2-6 were 54, 27, 13, 5, and 2, respectively.

The XRF-determined Pt and Ni areal loadings, Ta intensities, compositions, and Pt to Ta weight ratios prior to dealloying are summarized in Table 2, above. Pt contents ranged from 23.44 to 25.55 at. %, Ni contents ranged from 66.33 to 76.94 at. %, and Ta contents ranged from 0.25 to 10.23 at. %. The Pt to Ta weight ratios varied from 2 to 110.

The XRF-determined Pt and Ni areal loadings, Ta intensities, compositions, and Pt to Ta weight ratios after dealloying are summarized in Table 4, above. Pt contents ranged from 52.76 to 61.93 at. %, Ni contents ranged from 34.37 to 43.25 at. %, and Ta contents ranged from 0.20 to 10.54 at. %. The Pt to Ta weight ratios varied from 6 to 329.

The mass activity, specific area, and specific activity of Examples 2-6 after annealing, dealloying, and conditioning are summarized in Table 3, above.

The durability of Example 3 was measured using the AST described for Comparative Example B, above. The changes in mass activity, specific area, and specific activity after the AST are summarized in Table 5, above.

Figure 4:
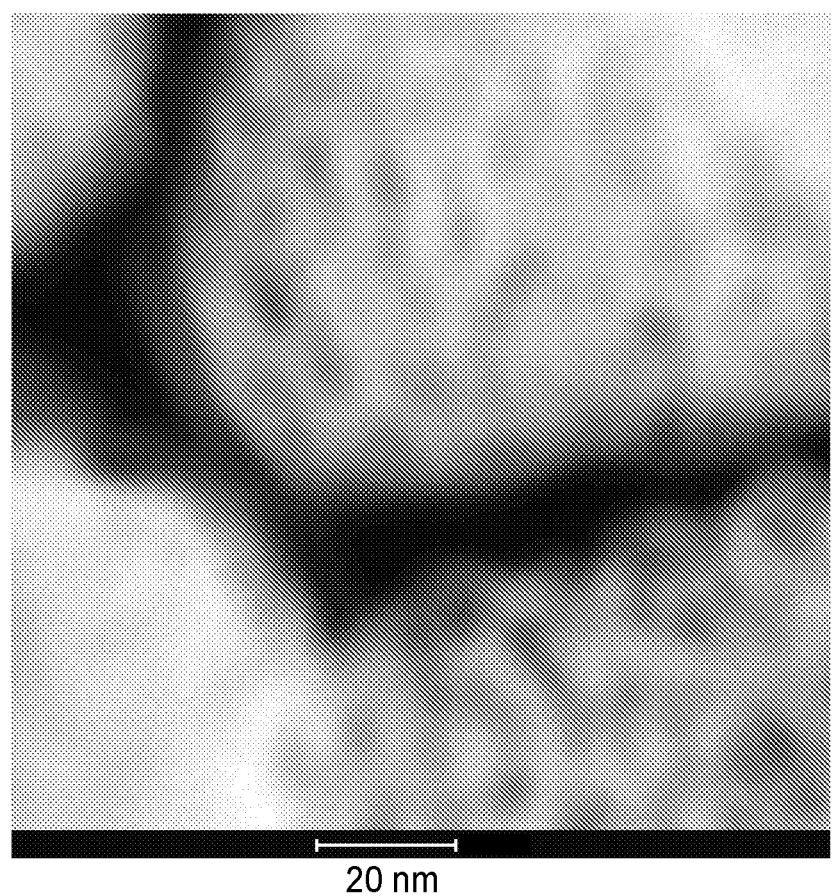
FIG. 4 is a High Angle Annular Dark Field Transmission Electron Micrograph of Example 3 catalyst at 900,000× magnification, after testing in fuel cell.
Figure 5:
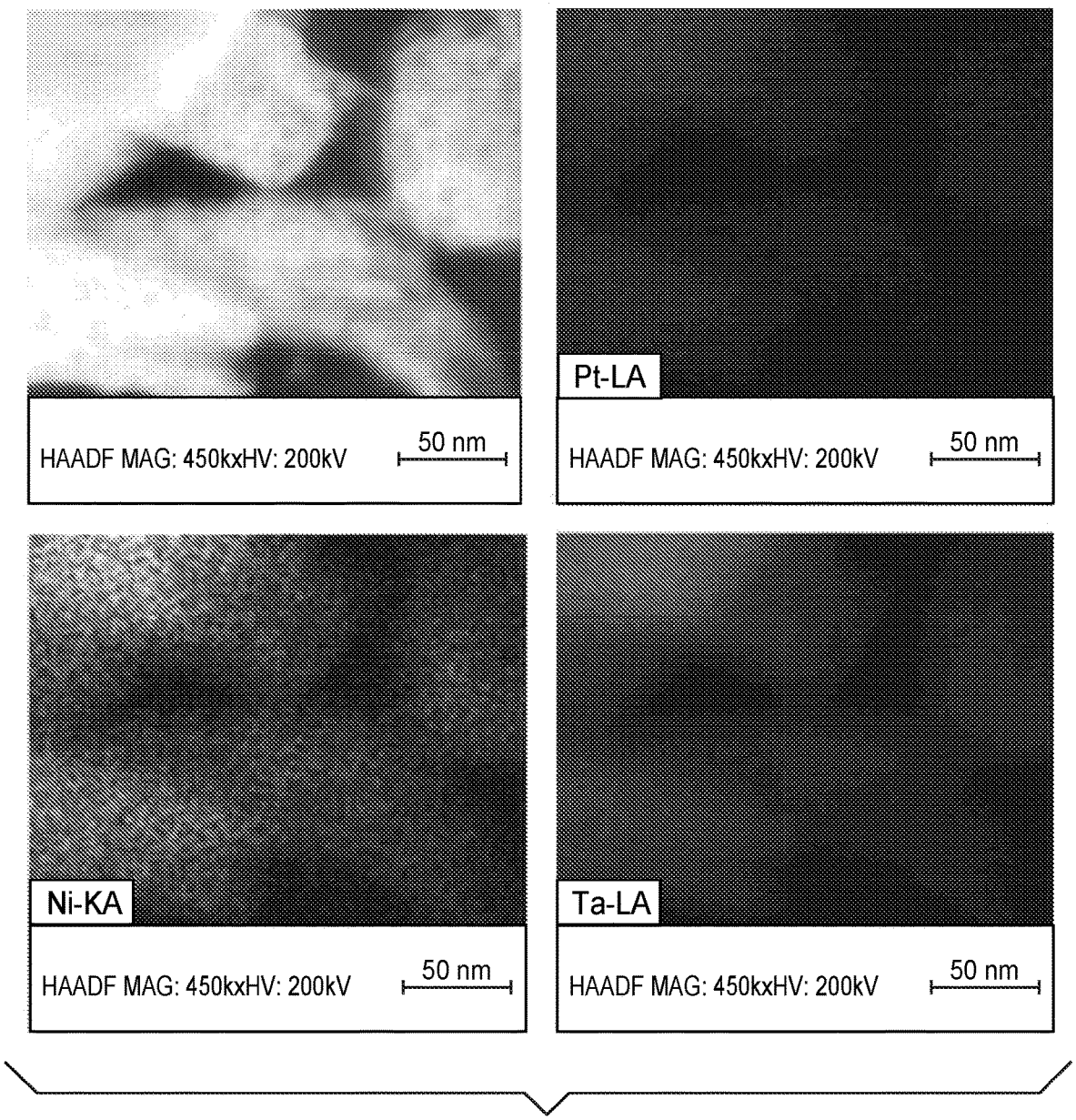
FIG. 5 is a High Angle Annular Dark Field Transmission Electron Micrograph and Energy Dispersive X-Ray Spectroscopy elemental maps for Example 3 catalyst at 450,000× magnification, after testing in fuel cell.

After fuel cell characterization, the structure of the Example 3 catalyst was analyzed by High Angle Annular Dark Field Transmission Electron Microscopy and Energy Dispersive X-Ray Spectroscopy. Micrographs from this analysis are shown in FIGS. 4 and 5.

Results

Table 4, above, summarizes the catalyst composition after dealloying for Comparative Example B, and Examples 1-6. The dealloying process was effective at removing Ni from the PtNiTa and PtNi catalysts, as the Ni content decreased from a range of about 67 to 75 at. % before dealloying to a range of about 34 to 44 at. % after dealloying.

Figure 3A:
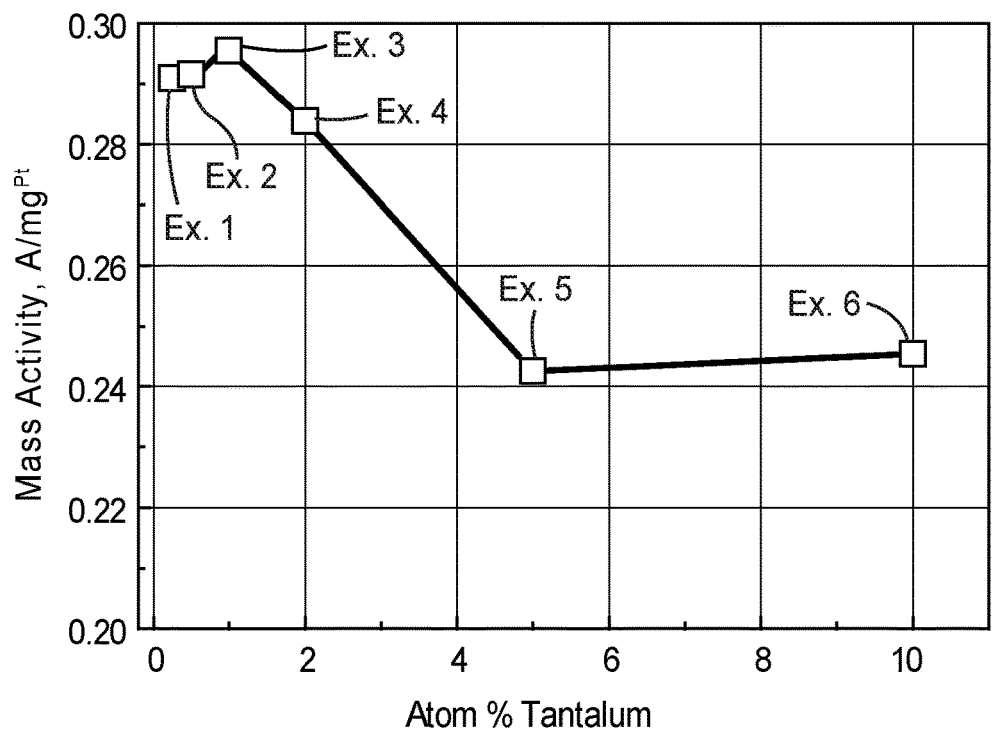
FIG. 3A is a plot of the electrocatalyst mass activity of Examples 1-6 catalysts, normalized to platinum content.

FIG. 3A summarizes the measured mass activity for Examples 1-6. The mass activity increased from 0.29 to 0.30 A/mg as the Ta content was increased from 0.25 to 1 at. % Ta. As Ta content was increased to 2 at. % Ta, mass activity decreased to 0.28 A/mg, and as Ta content was increased further to 5 and 10 at. % Ta, the mass activity decreased to 0.24 and 0.25 A/mg, respectively.

Figure 3B:
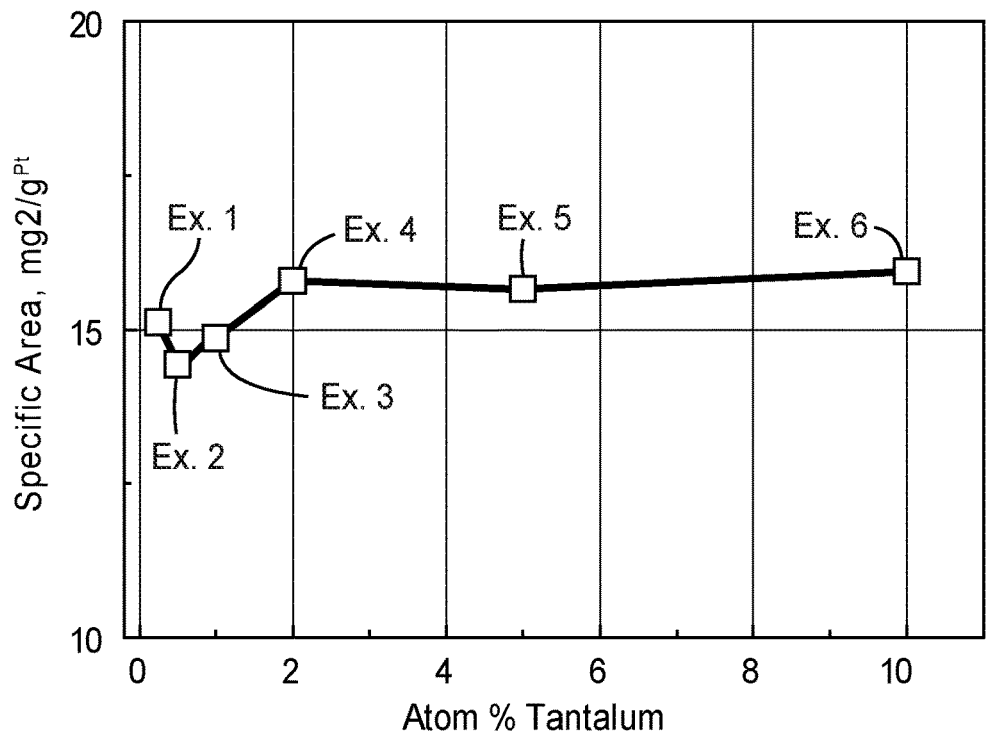
FIG. 3B is a plot of the electrocatalyst surface area of Examples 1-6 catalysts, normalized to platinum content.

FIG. 3B summarizes the measured specific surface area for Examples 1-6. Specific area was relatively insensitive to Pt content over the entire Ta composition range tested. As Ta content increased from a range of 0.25-1 at. % Ta to 2-10 at. % Ta, the specific area increased from a range of 14.4-15.1 m²/g to 15.6-15.9 m²/g. The observed specific areas of the PtNiTa samples are similar to the range observed with Ta-free Comparative Examples A-D, 13.8-17.5 m²/g, indicating that PtNiTa samples are also nanoporous.

Figure 3C:
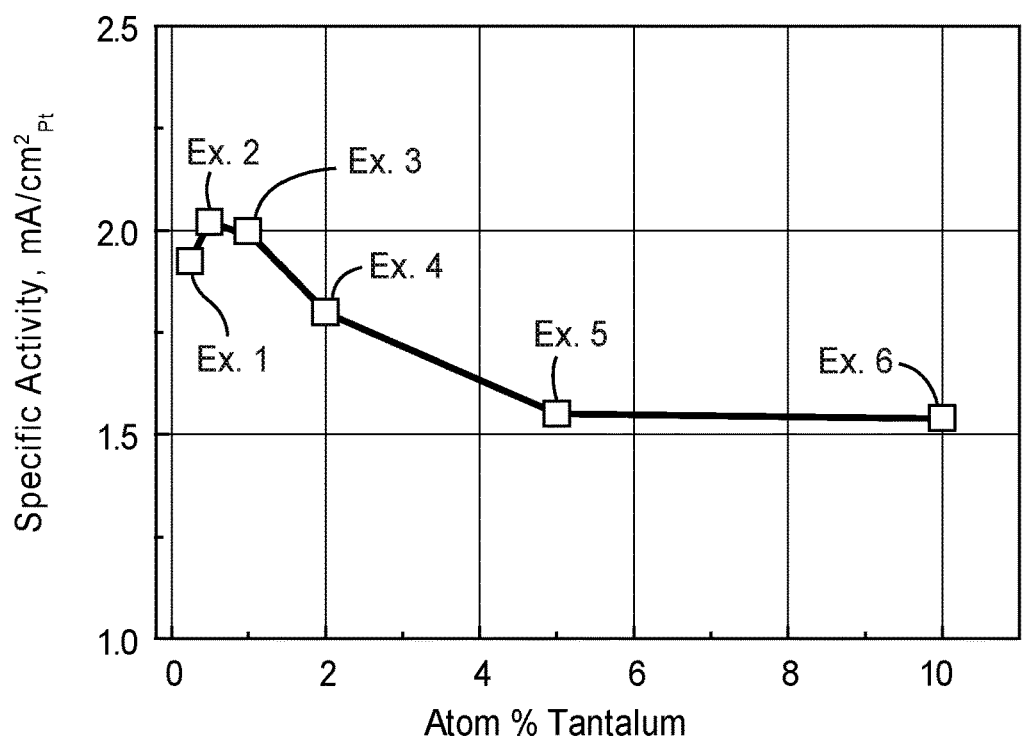
FIG. 3C is a plot of the electrocatalyst specific activity of Examples 1-6 catalysts.

FIG. 3C summarizes the measured specific activity for Example 1-6, Between 0.25 and 2 at. % Ta, the specific activity ranged from 1.80 to 2.02 mA/cm². As Ta content increased to 5 and 10 at. %, the specific activity decreased to 1.55 and 1.54 cm ².

A representative high angle annular dark field micrograph of Example 3 catalyst, after fuel cell testing, is shown in FIG. 4. Average pore sizes were determined to be in a range from 2 to 8.5 nm, with the mean pore size of about 5.5 nm. FIG. 5 is a high angle annular dark field micrograph and matching elemental maps obtained from Energy Dispersive X-Ray Spectroscopy from Example 3 catalyst, after fuel cell testing, showing the presence of Pt, Ni, and Ta within the nanoporous catalyst.

Table 5, above, above summarizes the changes in mass activity, specific area, and specific activity of Comparative Examples B-D and Example 3. After the AST, Example 3 lost 51% of its initial mass activity, whereas Comparative Examples B-D lost 67%, 64%, and 62%, respectively. Example 3 lost 21% specific activity, whereas Comparative Examples B-D lost 54%, 40%, and 30%, respectively.

Foreseeable modifications and alterations of this disclosure will be apparent to those skilled in the art without departing from the scope of this invention. This invention should not be restricted to the embodiments that are set forth in this application for illustrative purposes.

What is claimed is:

1. A nanoporous oxygen reduction catalyst material comprising at least 90 atomic percent collectively Pt, Ni, and Ta,
    wherein the nanoporous oxygen reduction catalyst material is in the form of at least one nanoporous layer comprising platinum and nickel,
    wherein there is a layer comprising tantalum on at least one of the nanoporous layers comprising platinum and nickel,
    wherein the tantalum is metallic or in an oxide phase, and
    wherein the nanoporous oxygen reduction catalyst material comprises in a range from 52.7 to 61.9 atomic percent Pt, in a range from 34.4 to 43.3 atomic percent Ni, and in a range from 0.2 to 10.5 atomic percent Ta, wherein the total atomic percent of Pt, Ni, and Ta equals 100.

2. The nanoporous oxygen reduction catalyst material of claim 1 having pores with diameters in a range from 1 nm to 10 nm.

3. The nanoporous oxygen reduction catalyst material of claim 1 comprising in a range from 52.7 to 59.6 atomic percent Pt, in a range from 34.4 to 43.3 atomic percent Ni, and in a range from 0.3 to 10.5 atomic percent Ta, wherein the total atomic percent of Pt, Ni, and Ta equals 100.

4. The nanoporous oxygen reduction catalyst material of claim 1, wherein the layer comprising tantalum has a planar equivalent thickness up to 50 nm.

5. The nanoporous oxygen reduction catalyst material of claim 1 having an exposed tantalum surface layer.

6. The nanoporous oxygen reduction catalyst material of claim 5, wherein the exposed tantalum surface layer is a sub-monolayer of tantalum.

7. The nanoporous oxygen reduction catalyst material of claim 1, wherein the weight ratio of platinum to tantalum is in a range from 2:1 to 250:1.

8. A catalyst comprising nanostructured elements comprising microstructured support whiskers having an outer surface at least partially covered by the nanoporous oxygen reduction catalyst material of claim 1.

9. A fuel cell membrane electrode assembly comprising the catalyst of claim 8.

10. A method comprising:
    providing an oxygen reduction catalyst material comprising Pt, Ni, and Ta, wherein there are layers comprising platinum and nickel; and
    dealloying at least some layers comprising platinum and nickel to remove at least a portion of the nickel from at least one layer to provide the nanoporous oxygen reduction catalyst material of claim 1.

11. The method of claim 10, further comprising annealing the catalyst before dealloying.

12. The method of claim 10, wherein the weight ratio of platinum to tantalum prior to dealloying is in a range from 6:1 to 329:1.

13. The method of any of claim 10, wherein the atomic ratio of platinum to nickel prior to dealloying is in a range from 0.05:1 to 0.43:1.

* * * * *